US012638375B2

(12) United States Patent
Imai et al.

(10) Patent No.: US 12,638,375 B2
(45) Date of Patent: May 26, 2026

(54) FLOW CYTOMETER, POSITION CALCULATION METHOD, AND PROGRAM

(71) Applicant: ThinkCyte K.K., Tokyo (JP)

(72) Inventors: Toru Imai, Tokyo (JP); Hiroaki Adachi, Tokyo (JP)

(73) Assignee: ThinkCyte K.K., Tokyo (JP)

( * ) Notice: Subject to any disclaimer, the term of this patent is extended or adjusted under 35 U.S.C. 154(b) by 114 days.

(21) Appl. No.: 18/800,748

(22) Filed: Aug. 12, 2024

(65) Prior Publication Data

US 2025/0044211 A1 Feb. 6, 2025

Related U.S. Application Data

(63) Continuation of application No. 18/700,584, filed as application No. PCT/JP2021/038289 on Oct. 15, 2021.

(51) Int. Cl.
*G01N 15/1404* (2024.01)
*G01N 15/14* (2006.01)
*G01N 15/1434* (2024.01)

(52) U.S. Cl.
CPC ..... *G01N 15/1404* (2013.01); *G01N 15/1434* (2013.01); *G01N 15/1484* (2013.01); *G01N 2015/1497* (2013.01)

(58) Field of Classification Search
CPC ........... G01N 15/1429; G01N 15/1404; G01N 15/1484; G01N 15/1459
See application file for complete search history.

(56) References Cited

U.S. PATENT DOCUMENTS

| | | | |
|---|---|---|---|
| 10,036,698 B2 * | 7/2018 | Yamamoto | ......... G01N 15/1427 |
| 2015/0057787 A1 | 2/2015 | Muraki et al. | |
| 2018/0327699 A1 | 11/2018 | Ota et al. | |

FOREIGN PATENT DOCUMENTS

| | | |
|---|---|---|
| JP | A-2011-099848 | 5/2011 |
| WO | WO 2013/145836 A1 | 10/2013 |
| WO | WO 2017/073737 A1 | 5/2017 |

OTHER PUBLICATIONS

Sadao Ota, "Ghost cytometry" Jun. 15, 2018 (Year: 2018).*

(Continued)

*Primary Examiner* — Maurice C Smith
(74) *Attorney, Agent, or Firm* — Wan Chieh Lee; Haug Partners LLP

(57) ABSTRACT

A flow cytometer includes a microfluidic device, a light source, a photodetector that detects, in time series, the intensity of signal light emitted from an observation object when the observation object flowing through a flow path is irradiated with illumination light, an information generation device that generates optical information indicating a structure of the observation object based on the intensity of the signal light, an arithmetic device, and a flow path position control device, wherein the arithmetic device includes a signal intensity acquiring unit that acquires electronic data of temporal changes in the intensity of the signal light detected based on a detection position predetermined in the flow path to detect the depth position in the flow path where the observation object passes through the flow path, a scan unit that performs a scan process to move the flow path in the depth direction and acquire the electronic data at different depth positions, a position calculation unit that calculates the depth position based on the electronic data, and an output unit that outputs position information indicating the depth position calculated by the position calculation unit.

11 Claims, 22 Drawing Sheets

(56)          References Cited

OTHER PUBLICATIONS

International Search Report mailed on Dec. 14, 2021 in PCT international application No. PCT/JP2021/038289 and its English translation.

\* cited by examiner

Figure 22:
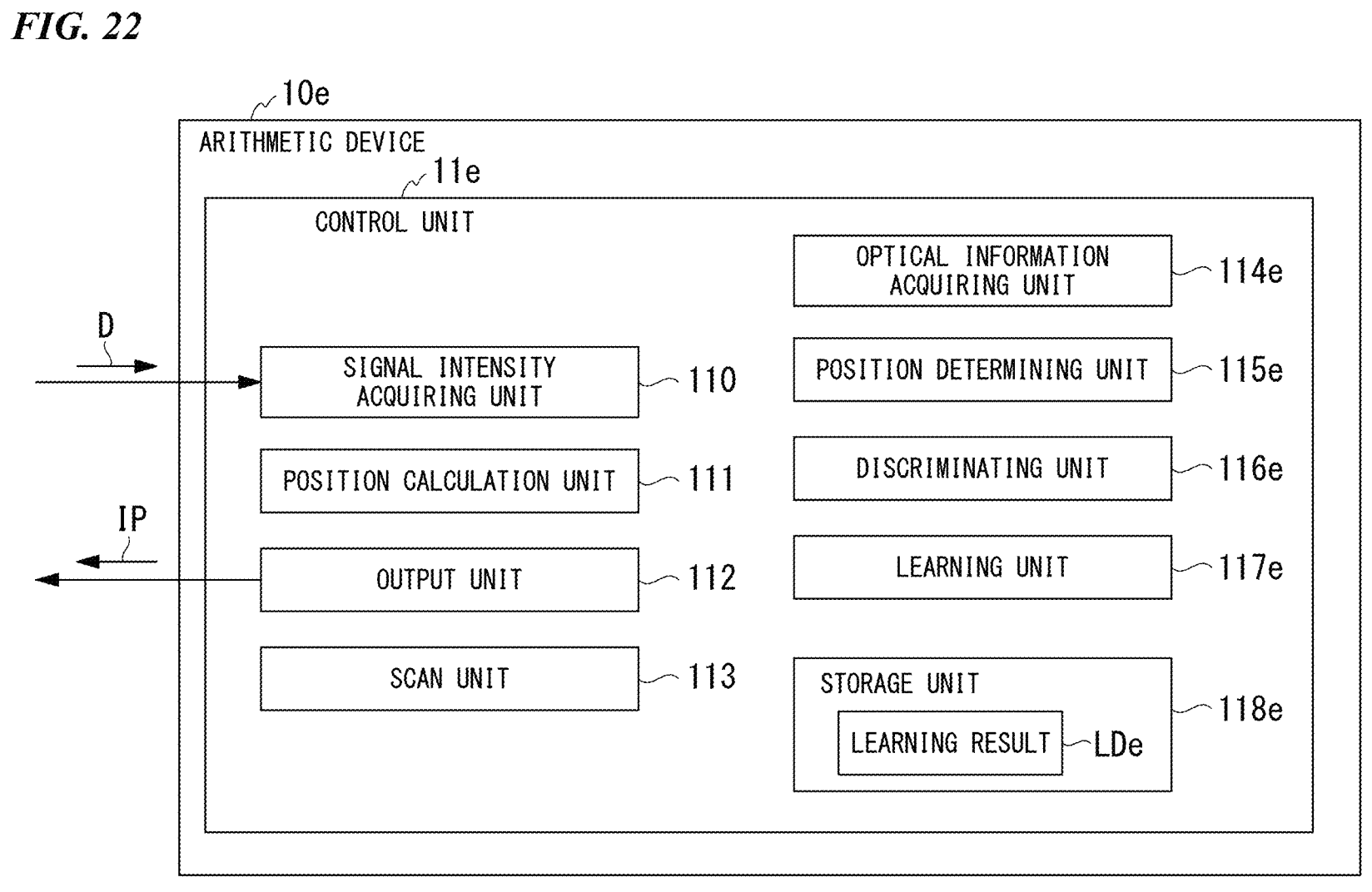

ARITHMETIC DEVICE 10e

11e

CONTROL UNIT

SIGNAL INTENSITY ACQUIRING UNIT 110

POSITION CALCULATION UNIT 111

OUTPUT UNIT 112

SCAN UNIT 113

OPTICAL INFORMATION ACQUIRING UNIT 114e

POSITION DETERMINING UNIT 115e

DISCRIMINATING UNIT 116e

LEARNING UNIT 117e

STORAGE UNIT 118e

LEARNING RESULT LDe

D

IP

FLOW CYTOMETER, POSITION CALCULATION METHOD, AND PROGRAM

PRIORITY CLAIM

This application is a continuation application of U.S. patent application Ser. No. 18/700,584, filed Apr. 11, 2024, which is a national stage application under 35 U.S.C. § 371 of PCT Application No. PCT/JP2021/038289, filed Oct. 15, 2021, published Apr. 20, 2023 as PCT Publication No. WO 2023/062831 A1, which are hereby incorporated by reference herein in their entirety.

TECHNICAL FIELD

The present invention relates to a flow cytometer, a position calculation method, and a program.

BACKGROUND ART

A flow cytometry method in which an observation object is fluorescently dyed and characteristics of the observation object are evaluated based on the total amounts of fluorescence brightness and the total amount of scattered light and a flow cytometer using this flow cytometry method are known in the related art (for example, Patent Document 1). However, with such measurement methods based on limited information such as the total amounts of fluorescence brightness and the total amount of scattered light, it is difficult to determine two-dimensional spatial characteristics of measurement objects such as the shape of intracellular organelles or morphological information of cells and to use them for evaluation. On the other hand, fluorescence microscopes and imaging cytometers that evaluate microparticles such as cells and bacteria, which are observation objects, using images are known, but these imaging devices are limited in imaging speed and have problems such as being expensive and being large in size.

Thus, flow cytometers which detect an observation object by irradiating the observation object with structured illumination light having a predetermined illumination pattern and imaging cytometers have been developed to provide high-speed, high-sensitivity, low-cost, and compact imaging devices. As an example of such methods, for example, ghost cytometry technology is known (Patent Document 2). In the ghost cytometry technology, by irradiating observation objects moving in a flow path with a randomly structured illumination pattern, it becomes possible to rapidly acquire morphological information of an observation object with higher resolution than flow cytometers of the related art.

CITATION LIST

Patent Document

Patent Document 1

Japanese Unexamined Patent Application, First Publication No. 2011-099848

Patent Document 2

PCT International Publication No. WO2017/073737

SUMMARY OF INVENTION

Technical Problem

However, detection with randomly structured illumination patterns is particularly sensitive to a positional deviation of a flow line. Here, the positional deviation of the flow line indicates that the position of an observation object flowing together with a fluid flowing through a flow path relatively deviates with respect to a structured illumination pattern in the width direction of the flow path or in the depth direction of the flow path. In a measurement method such as flow cytometry in which an observation object is measured while flowing along with a fluid, a flow line along which the observation object flows is affected by pressure fluctuations in the fluid or the like and thus it is extremely difficult to precisely control its movement. Therefore, when performing measurements using a flow cytometer, it is required that a positional deviation of a flow line be detected at the start of observation or during observation and the position of the flow path be corrected in response to the positional deviation of the flow line. In particular, in the flow cytometer in which more precise and faster measurements are achieved by irradiating an observation object with randomly structured illumination light and detecting light emitted from the observation object as signal light, monitoring of positional deviation of flow lines in real time and performing measurement while correcting the occurring positional deviation of flow lines or correcting the position of the flow path to compensate for the positional deviation of flow lines are required in order to reduce fluctuations in measurement results and ensure data reproducibility. The degree of a positional deviation of a flow line in question in the present invention is, for example, the deviation by about a pixel size of the structured illumination pattern, which is irradiated into the flow path in the depth direction of the flow path. The positional deviation of a flow line in question in the present invention is a pixel-sized deviation of a structured detection position in the flow path and it is a deviation of several micrometers in the depth direction of the flow path.

The present invention has been made in view of the above points and provides a flow cytometer, a method of calculating a depth position in a flow path, and a program that can detect the passage position of an observation object in the depth direction in a flow path. Here, the depth direction of the flow path in the present invention is a direction perpendicular to both a longitudinal direction to which a fluid flows and a width direction of the flow path in the flow path through which an observation object flow.

Solution to Problem

The present invention has been made to solve the above problems and an aspect of the present invention is a flow cytometer including a microfluidic device including a flow path through which an observation object is able to flow together with a fluid, a light source configured to irradiate the flow path with illumination light, a photodetector configured to detect, in time series, an intensity of signal light emitted from the observation object when the observation object flowing through the flow path is irradiated with the illumination light, an information generation device configured to generate optical information indicating any one or more of a shape, form, or structure of the observation object based on the intensity of the signal light detected by the photodetector, a flow path position control device configured to control the position in a depth direction of the flow path, and an arithmetic device configured to detect a depth position, which is a position in the depth direction of the flow path where the observation object passes through the flow path, based on a time series changes in the intensity of the signal light detected by the photodetector, wherein the arithmetic device includes a signal intensity acquiring unit configured to acquire electronic data of temporal changes in the intensity of the signal light detected at a detection position predetermined in the flow path to detect the depth position, a scan unit configured to perform a scan process to move the flow path in the depth direction via the flow path position control device and acquire the electronic data at different depth positions, a position calculation unit configured to calculate the depth position based on the electronic data, and an output unit configured to output position information indicating the depth position calculated by the position calculation unit.

An aspect of the present invention is the above flow cytometer, further including a spatial light modulation unit installed in an optical path between the light source and the photodetector to structure either the illumination light or the signal light.

An aspect of the present invention is the above flow cytometer, wherein the spatial light modulation unit is disposed in an optical path between the light source and the flow path and the light source is configured to irradiate the flow path with the illumination light structured by the spatial light modulation unit.

An aspect of the present invention is the above flow cytometer, wherein the detection position is established in the flow path by the illumination light structured by the spatial light modulation unit.

An aspect of the present invention is the above flow cytometer, wherein the spatial light modulation unit is disposed in an optical path between the flow path and the photodetector and the photodetector is configured to detect the intensity of the structured signal light in time series.

An aspect of the present invention is the above flow cytometer, wherein the spatial light modulation unit includes a mask having light transmissive regions through which light is transmitted, the light transmissive regions are disposed at a position forming an imaging relationship with a plurality of the detection positions in the flow path, and the arithmetic device is configured to detect the depth position based on the temporal changes in the intensity of the signal light emitted from the observation object detected at the plurality of detection positions in the flow path.

An aspect of the present invention is the above flow cytometer, wherein the flow path position control device is configured to control a position in the depth direction of the flow path based on information indicating the depth position output by the output unit.

An aspect of the present invention is the above flow cytometer, wherein the arithmetic device further includes a discriminating unit configured to discriminate the observation object based on the optical information generated by the information generation device, and a position determining unit configured to determine whether or not the depth position indicated by the position information output by the output unit is within a predetermined range in the depth direction in the flow path, and the discriminating unit is configured to designate the observation object flowing within the predetermined range as an object to be discriminated based on a determination result of the position determining unit.

An aspect of the present invention is the above flow cytometer, wherein the discriminating unit is configured to discriminate the observation object based on both an inference model created by learning a relationship between an observation object for training and the optical information regarding the observation object for training and the optical information generated by the information generation device, and the observation object for training is an observation object flowing within the predetermined range.

An aspect of the present invention is a position calculation method for detecting a depth position in a flow cytometer including a microfluidic device including a flow path through which an observation object is able to flow together with a fluid, a light source configured to irradiate the flow path with illumination light, a photodetector configured to detect, in time series, an intensity of signal light emitted from the observation object when the observation object flowing through the flow path is irradiated with the illumination light, an information generation device configured to generate optical information indicating any one or more of a shape, form, or structure of the observation object based on the intensity of the signal light detected by the photodetector, a flow path position control device configured to control a position in a depth direction of the flow path, and an arithmetic device configured to detect the depth position, which is a position in the depth direction of the flow path where the observation object passes through the flow path, based on time series changes in the intensity of the signal light detected by the photodetector, the position calculation method including a procedure of acquiring electronic data of temporal changes in the intensity of the signal light detected at a detection position predetermined in the flow path to detect the depth position, a procedure of performing a scan process to move the flow path in the depth direction via the flow path position control device and acquire the electronic data at different depth positions, a position calculation procedure of calculating the depth position based on the electronic data, and an output procedure of outputting position information indicating the depth position calculated in the position calculation procedure.

An aspect of the present invention is a program for a flow cytometer including a microfluidic device including a flow path through which an observation object is able to flow together with a fluid, a light source configured to irradiate the flow path with illumination light, a photodetector configured to detect, in time series, an intensity of signal light emitted from the observation object when the observation object flowing through the flow path is irradiated with the illumination light, an information generation device configured to generate optical information indicating any one or more of a shape, form, or structure of the observation object based on the intensity of the signal light detected by the photodetector, a flow path position control device configured to control a position in a depth direction of the flow path, and an arithmetic device configured to detect the depth position, which is a position in the depth direction of the flow path where the observation object passes through the flow path, based on time series changes in the intensity of the signal light detected by the photodetector, the program causing the arithmetic device that performs a position calculation process for detecting the depth position in the flow cytometer to perform a step of acquiring electronic data of temporal changes in the intensity of the signal light detected at a detection position predetermined in the flow path to detect the depth position, a step of performing a scan process to move the flow path in the depth direction via the flow path position control device and acquire the electronic data at different depth positions, a position calculation step of calculating the depth position based on the electronic data, and an output step of outputting position information indicating the depth position calculated in the position calculation step.

Advantageous Effects of Invention

According to the present invention, it is possible to detect the passage position of the observation object in the depth direction in the flow path.

BRIEF DESCRIPTION OF DRAWINGS

FIG. 8 is a diagram showing an example of a configuration of an arithmetic device according to the first embodiment of the present invention.

FIG. 9 is a diagram showing an example of a position calculation process according to the first embodiment of the present invention.

FIG. 19 is a diagram showing an example of a side view of the arrangement of a mask according to a fifth embodiment of the present invention.

FIG. 22 is a diagram showing an example of a configuration of an arithmetic device according to a sixth embodiment of the present invention.

DESCRIPTION OF EMBODIMENTS

First Embodiment

Figure 1:
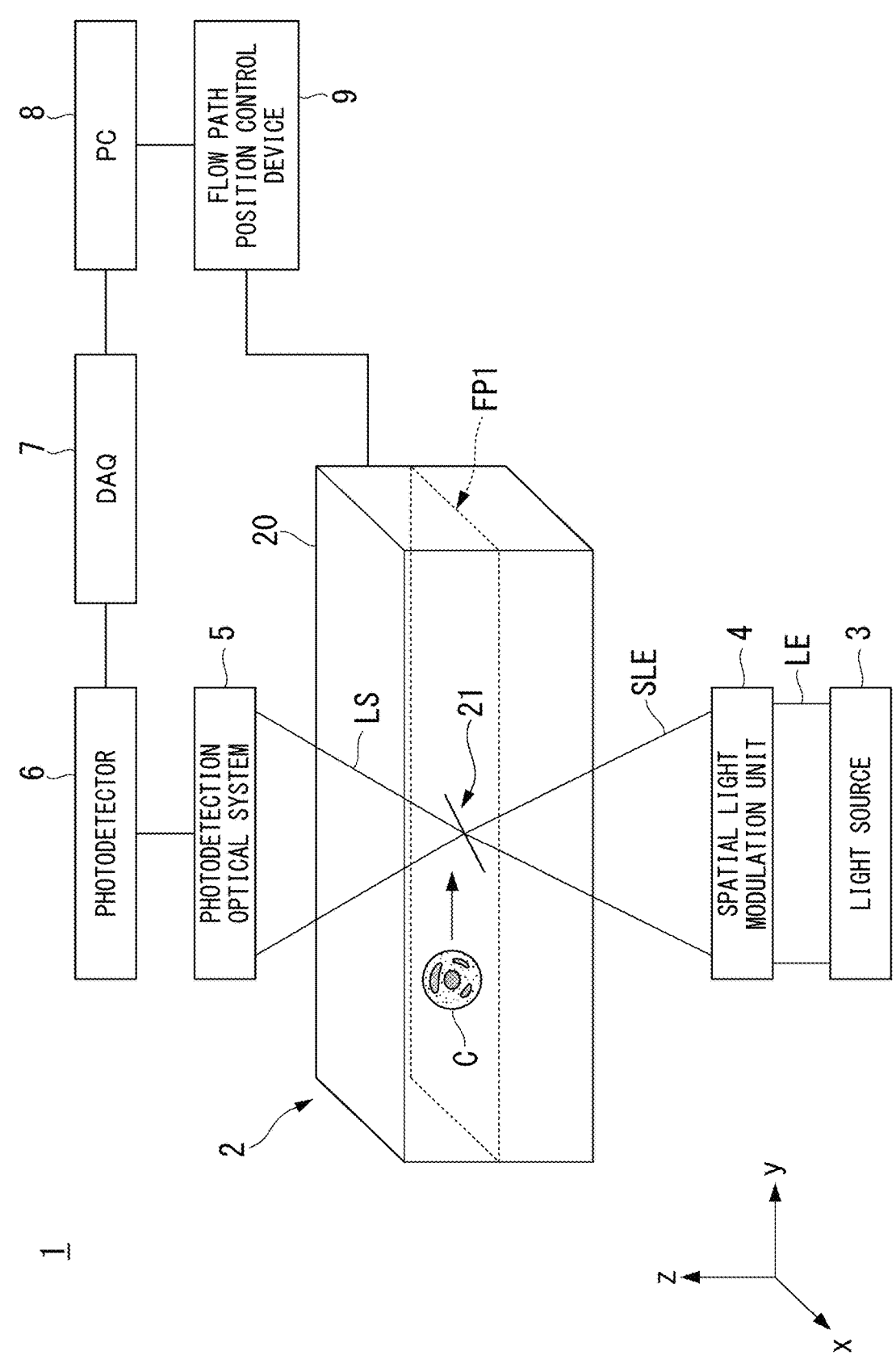
FIG. 1 is a diagram showing an example of a flow cytometer according to a first embodiment of the present invention.

Hereinafter, embodiments of the present invention will be described in detail with reference to the drawings. FIG. 1 is a diagram showing an example of a flow cytometer 1 according to the present embodiment. A flow cytometer is a measurement device that includes at least a microfluidic device including a flow path through which an observation object can flow together with a fluid, a light source that irradiates the flow path with illumination light, and a photodetector that detects signal light emitted from an observation object flowing through the flow path when it is irradiated with the illumination light, and the observation object that flows through the flow path together with the fluid is optically measured while moving in the flow path. The flow cytometer 1 according to the present embodiment includes the microfluidic device 2, the light source 3, a spatial light modulation unit 4, a photodetection optical system 5, the photodetector 6, a data acquisition (DAQ) device 7, and a personal computer (PC) 8.

The microfluidic device 2 includes the flow path 20 through which cells C can flow together with a fluid. The flow rate of the fluid flowing through the flow path 20 is constant regardless of the types or individual differences of cells C to be flowed. In the microfluidic device 2, a plurality of cells sequentially flow through the flow path 20, but the number of cells passing through an illumination light irradiation position of the flow path 20 at a time is one. A cell C is an example of an observation object. An observation object is not limited to a cell C and may be a fine particle or the like as another example.

Here, FIG. 1 shows an xyz coordinate system as a three-dimensional orthogonal coordinate system. In the present embodiment, the x-axis direction is the width direction of the flow path 20. The y-axis direction is the longitudinal direction of the flow path 20. The z-axis direction is a direction perpendicular to the flow path 20 and is the depth direction of the flow path 20. The flow of a fluid in the flow path 20 moves cells C in the positive y-axis direction. That is, the longitudinal direction of the flow path 20 is the direction to which cells C move through the flow path 20 together with the flow of the fluid. Namely, the width direction of the flow path 20 can be expressed as a direction perpendicular to both the optical axis of the illumination light irradiated into the flow path and the longitudinal direction to which the fluid flows.

The light source 3 and the spatial light modulation unit 4 function as a structured illumination. This structured illumination irradiates the flow path 20 with structured illumination light SLE as described below.

The illumination light LE emitted from the light source 3 is converted into structured illumination light SLE that has been structured through the spatial light modulation unit 4 and is irradiated onto the irradiation position of the flow path 20. The illumination light LE emitted from the light source 3 may be coherent light or incoherent light. In the present embodiment, the illumination light LE emitted from the light source 3 is, for example, coherent light.

The spatial light modulation unit 4 is arranged in an optical path between the light source 3 and the photodetector 6. In the present embodiment, the spatial light modulation unit 4 is arranged in an optical path between the light source 3 and the flow path 20. A configuration with this arrangement is also referred to as a structured illumination configuration. The illumination light LE emitted from the light source 3 is structured by the spatial light modulation unit 4 and the structured illumination light SLE is irradiated into the flow path 20. Here, the structured illumination images the structured illumination light SLE at the irradiation position in the flow path 20 as a structured illumination pattern 21. In FIG. 1, a focal plane in which the structured illumination pattern 21 imaged at the irradiation position is disposed is shown as a focal plane FP1.

The structured illumination pattern 21 in the present embodiment includes an optical information generation pattern and a calibration pattern CP. The optical information generation pattern is a pattern that is irradiated into the flow path 20 in order to generate optical information IC indicating morphological information of a cell C, which is an observation object. The morphological information of a cell C is any one or more of the shape, form, or structure of the cell C. The calibration pattern CP is a pattern that is disposed at a detection position for detecting a depth position PP where a cell C, which is an observation object, passes in the flow path 20. The depth position PP is a position in the depth direction of the flow path 20 of the position where the cell C passes through the flow path 20, and it is a position indicating a deviation in the depth direction of the position where the cell C, which is an observation object, passes in the flow path 20. In the present embodiment, the depth direction of the flow path 20 matches the direction of the optical axis OX of the photodetection optical system 5, which is the direction of the z axis. Hereinafter, the direction of the optical axis OX of this photodetection optical system 5 may be simply referred to as the direction of the optical axis OX.

In the present embodiment, as described above, the structured illumination light SLE is imaged into the structured illumination pattern 21 on the flow path 20 and the calibration pattern CP is included in the structured illumination pattern 21. The structured illumination, which is provided with the light source 3 and the spatial light modulation unit 4, is an example of an illumination optical system. The structured illumination illuminates each of a plurality of detection positions with structured light to detect the depth position PP with the photodetector 6. Common structured light is used for both the light to illuminate the calibration pattern CP for detecting the depth position PP with the photodetector 6 and the light used for the illumination to generate the optical information IC indicating the morphological information of a cell C, which is an observation object.

In the following description, the position where the calibration pattern CP is disposed in the flow path 20 to detect the depth position PP of a cell C, which is an observation object, will also be referred to as a detection position. Details of the calibration pattern CP will be described later.

Figure 2:
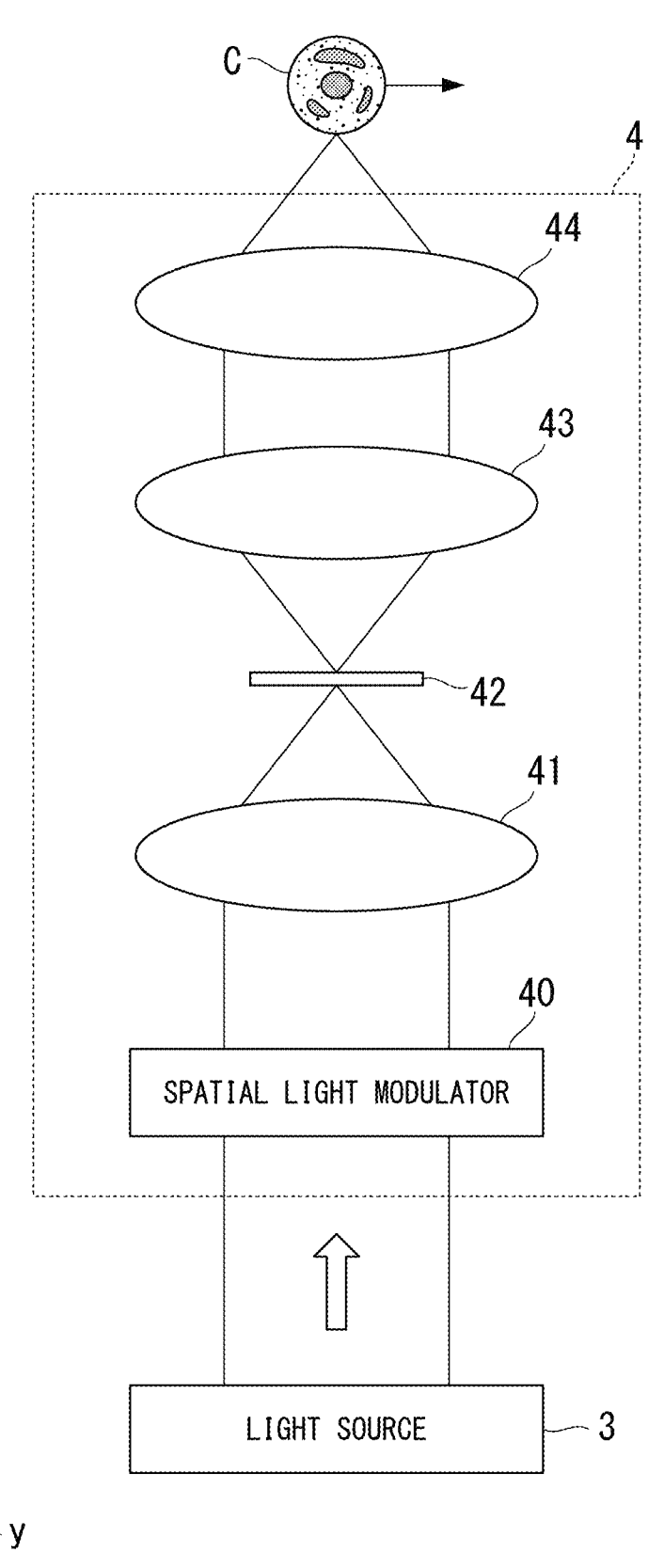
FIG. 2 is a diagram showing an example of a spatial light modulation unit according to the first embodiment of the present invention.

Here, the spatial light modulation unit 4 will be described with reference to FIG. 2. FIG. 2 is a diagram showing an example of the spatial light modulation unit 4 according to the present embodiment. The spatial light modulation unit 4 includes a spatial light modulator 40, a first lens 41, a spatial filter 42, a second lens 43, and an objective lens 44. In the spatial light modulation unit 4, the spatial light modulator 40, the first lens 41, the spatial filter 42, the second lens 43, and the objective lens 44 are arranged in the optical path between the light source 3 and the photodetector 6 in this order from the side closest to the light source 3.

The spatial light modulator 40 structures incident light. Structuring the incident light means changing the optical characteristics of the incident light for each of a plurality of regions included in an incident surface of the incident light. The spatial light modulator 40 structures the illumination light LE and converts it into structured illumination light SLE. The spatial light modulator 40 is an optical element that changes the spatial distribution of incident light and alters the optical characteristics of the incident light. Light irradiation while controlling the pattern of light irradiation becomes possible by the spatial light modulator 40. The light incident surface of the spatial light modulator 40 has a plurality of regions and the optical characteristics of the illumination light LE are converted individually in each of the plurality of regions through which it passes. That is, light transmitted through the spatial light modulator 40 changes such that the optical characteristics of the transmitted light differ from the optical characteristics of the incident light in each of the plurality of regions. The optical characteristics of incident light are, for example, characteristics relating to any one or more of the intensity, wavelength, phase, and polarization state. The optical characteristics are not limited to these. Examples of the spatial light modulator 40 include a diffractive optical element (DOE), a spatial light modulator (SLM), a digital micromirror device (DMD), and a film whose surface is printed with a plurality of regions with different optical characteristics. The spatial light modulator 40 is a DMD when the illumination light LE emitted by the light source 3 is incoherent light.

In the present embodiment, the spatial light modulator 40 is, for example, a DOE which is an optical element that controls the diffraction phenomenon of light using a formed fine shape. The light here is illumination light LE. In the following description, regions through which the spatial light modulator 40 transmits light will be referred to as transmissive regions.

In the following description, a position in the flow path 20 which is irradiated with the structured illumination light SLE will also be referred to as an irradiation position. In the present embodiment, the irradiation position corresponds to transmissive regions of the spatial light modulator 40. The shape and size of a transmissive region of the spatial light modulator 40 are same for each of the transmissive regions of the spatial light modulator 40. The shape of the transmissive region is, for example, a square. The squares of the transmissive regions of the spatial light modulator 40 have one sides of equal length. A cell C that has passed through the irradiation position emits light due to its fluorescent molecules being excited by the structured illumination light SLE. Fluorescence caused by this light emission is an example of signal light LS that is emitted from a cell C flowing through the flow path 20 when the cell C is irradiated with the structured illumination light SLE. Other examples of the signal light LS include transmitted light of the structured illumination light SLE through the cell C, scattered light due to the scattering of the structured illumination light SLE by the cell C, and interference light between the structured illumination light SLE and other light.

The shapes of the transmissive regions of the spatial light modulator 40 are not limited to squares and the sizes thereof can be freely changed as long as the shapes and sizes of the transmissive regions are uniform. The shapes of the transparent regions may be, for example, other polygons or circles.

The first lens 41 collects the structured illumination light SLE transmitted through the spatial light modulator 40 onto the spatial filter 42.

The spatial filter 42 removes components corresponding to spatially varying noise from the structured illumination light SLE focused by the first lens 41 to make the intensity distribution of the structured illumination light SLE closer to a Gaussian distribution.

The second lens 43 converts the structured illumination light SLE from which noise has been removed by the spatial filter 42 into parallel light.

The objective lens 44 collects the structured illumination light SLE that has been converted into parallel light by the second lens 43 and focuses it on the irradiation position in the flow path 20.

The objective lens 44 may be a dry objective lens or a liquid immersion objective lens. The liquid immersion objective lens is an oil immersion lens, a water immersion lens, or the like.

Returning to FIG. 1, the description of the configuration of the flow cytometer 1 will be continued.

The photodetection optical system 5 is an optical system for collecting the signal light LS from the cell C onto the photodetector 6 and includes an imaging lens 50 (not shown) in its configuration. The signal light LS from the cell C is fluorescence, transmitted light, scattered light, or interference light. The imaging lens 50 collects the signal light LS from the cell C onto the photodetector 6. The imaging lens 50 does not need to image the signal light LS from the cell C as long as it collects the signal light LS from the cell C onto the position of the photodetector 6. However, more preferably the imaging lens 50 is disposed at a position where it images the signal light LS at the position of the photodetector 6. The photodetection optical system 5 may further include a dichroic mirror or a wavelength selective filter.

The photodetector 6 detects the signal light LS focused by the imaging lens 50. Here, the photodetector 6 detects the signal light LS and converts it into an electrical signal. The photodetector 6 is, for example, a photomultiplier tube (PMT). The photodetector 6 detects the intensity of the signal light LS collected by the imaging lens 50 in time series. The signal light LS is emitted from the cell C flowing through the flow path 20 when the cell C is irradiated with the structured illumination light SLE as described above. That is, the photodetector 6 detects in time series the intensity of the signal light LS emitted from the cell C flowing through the flow path 20 when the cell C is irradiated with the structured illumination light SLE. The photodetector 6 may be a single sensor composed of a single light receiving element or may be a multi-sensor composed of a plurality of light receiving elements.

The DAQ device 7 converts electrical signal pulses output by the photodetector 6 into electronic data for each pulse. The electronic data includes a set of the time and the intensity of each electrical signal pulse. The DAQ device 7 is, for example, an oscilloscope.

In the present embodiment, the PC 8 has the functions of an information generation device and an arithmetic device. As an information generation device, the PC 8 generates optical information IC regarding the morphology of the cell C based on electronic data output from the DAQ device 7. The optical information IC is optical information indicating morphological information of the cell C. The PC 8 further stores the generated optical information IC. In the following description, the process of storing the optical information IC generated by the PC 8 will also be referred to as recording. The PC 8 is an example of an information generation device.

In the present embodiment, a cell C passing through the flow path 20 is illuminated by the structured illumination configuration and signal light LS from the cell C is detected by the photodetector 6. In the present embodiment, the optical information IC is information that indicates a temporal changes in the intensity of the signal light LS from the cell C as a waveform. This waveform corresponds to the morphology of the cell C and the optical information IC can be used to identify the cell C. The optical information IC is used, for example, in machine learning as training data to learn the relationship between the morphology of cells C and waveform signals, and an inference model thus obtained is used to identify a cell C from a waveform signal measured during inference.

In the present embodiment, the spatial light modulation unit 4 installed between the light source 3 and the microfluidic device 2 performs structuring processing to convert illumination light into structured illumination by the structured illumination configuration. The flow path 20 included in the microfluidic device 2 is irradiated with the structured illumination and the photodetector 6 detects signal light LS emitted from an observation object (a cell C) to acquire optical information IC identifying the cell C. As described above, acquiring the optical information identifying the cell C through structuring of light by the spatial light modulation unit 4 will also be referred to as acquiring or generating optical information through structuring processing by the spatial light modulation unit 4 in the following description. In the present embodiment, the structuring processing by the spatial light modulation unit 4 is performed as a process of converting the illumination light LE into the structured illumination light SLE by the structured illumination configuration. The PC 8 will also be described as an example of an information generation device that generates optical information IC indicating the morphological information of an observation object based on the intensity of signal light LS detected by the photodetector 6.

Also, as an arithmetic device, the PC 8 calculates a depth position PP through which the cell C passes when moving in the flow path 20 based on a parameter of temporal changes in the intensity of signal light LS detected at a detection position, which is a position for detecting the depth position PP. Here, the detection position is a position where the flow path 20 is irradiated with the illumination of the calibration pattern CP in order to detect the depth position PP through which the cell C passes in the flow path 20 and signal light LS that the cell C emits by being irradiated with the calibration pattern CP is detected by the photodetector 6 via the photodetection optical system 5. In the present embodiment, the illumination of the calibration pattern CP is included in the structured illumination for acquiring the optical information IC and is irradiated into the flow path 20 as the structured illumination pattern 21. The PC 8 is an example of an arithmetic device and calculates the depth position PP of the cell C based on the temporal changes in the intensity of the detected signal light LS.

The flow path position control device 9 controls the position in the depth direction of the flow path 20. In the present embodiment, the direction of the optical axis OX and the depth direction of the flow path 20 match. In the example shown in FIG. 1, the depth direction of the flow path 20 is the direction of the z axis. The flow path position control device 9 is, for example, a driver that drives a piezo stage on which the flow path 20 is placed. The flow path position control device 9 moves the flow path in the direction of the optical axis OX and continuously acquires signals of temporal changes in the intensity of the signal light LS at various positions in the optical axis direction of the flow path 20 to calculate the depth position PP. The flow path position control device 9 further performs feedback control with respect to a positional deviation of a flow line FX, along which the cell C moves, in the depth direction of the flow path, based on the depth position PP of the cell C calculated by the PC 8.

Calibration Pattern

In the present embodiment, a calibration pattern CP is disposed at a predetermined position in the flow path 20 to detect a depth position PP which is a position in the depth direction (the direction of the z axis in FIG. 1) through which the cell C passes in the flow path 20 when moving through the flow path as described above.

Figure 3:
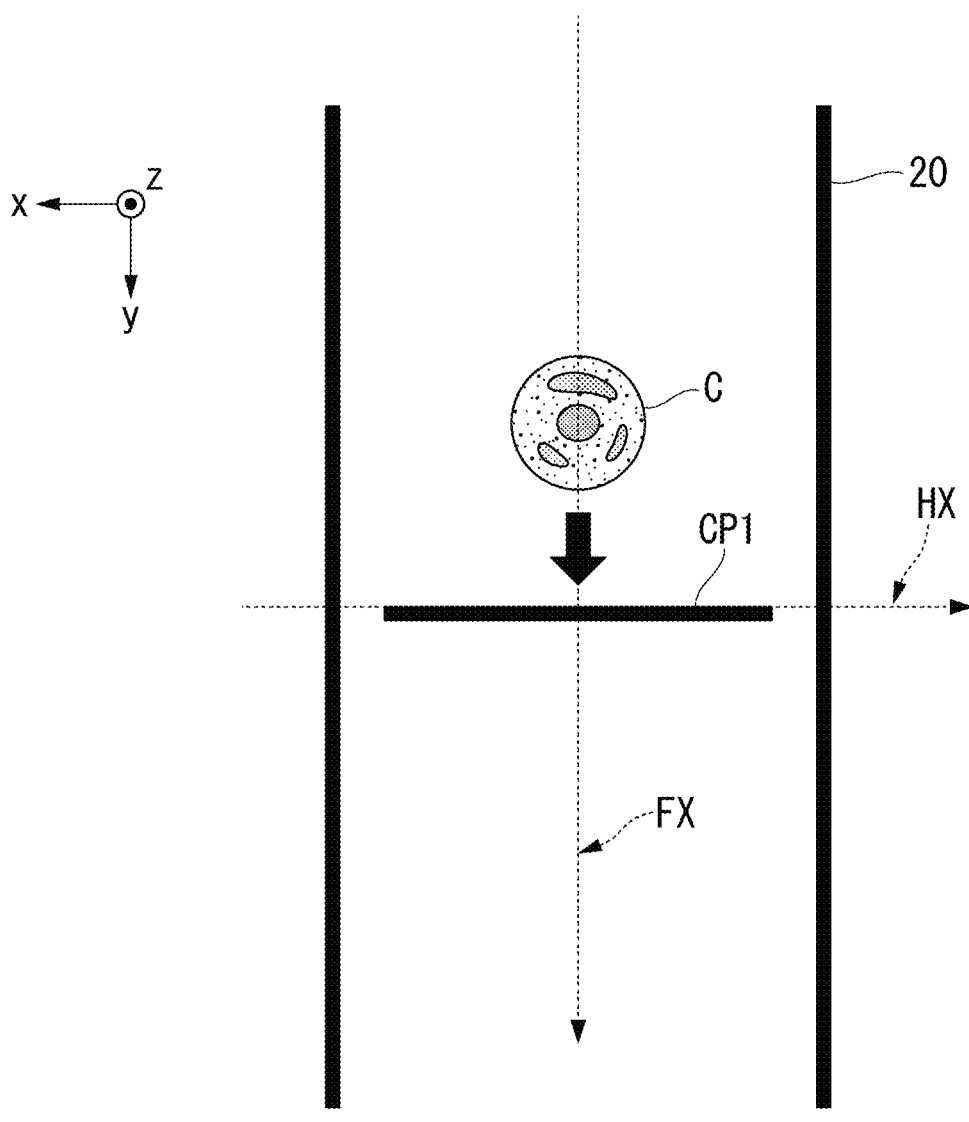
FIG. 3 is a diagram showing an example of a front view of a calibration pattern according to the first embodiment of the present invention.
Figure 4:
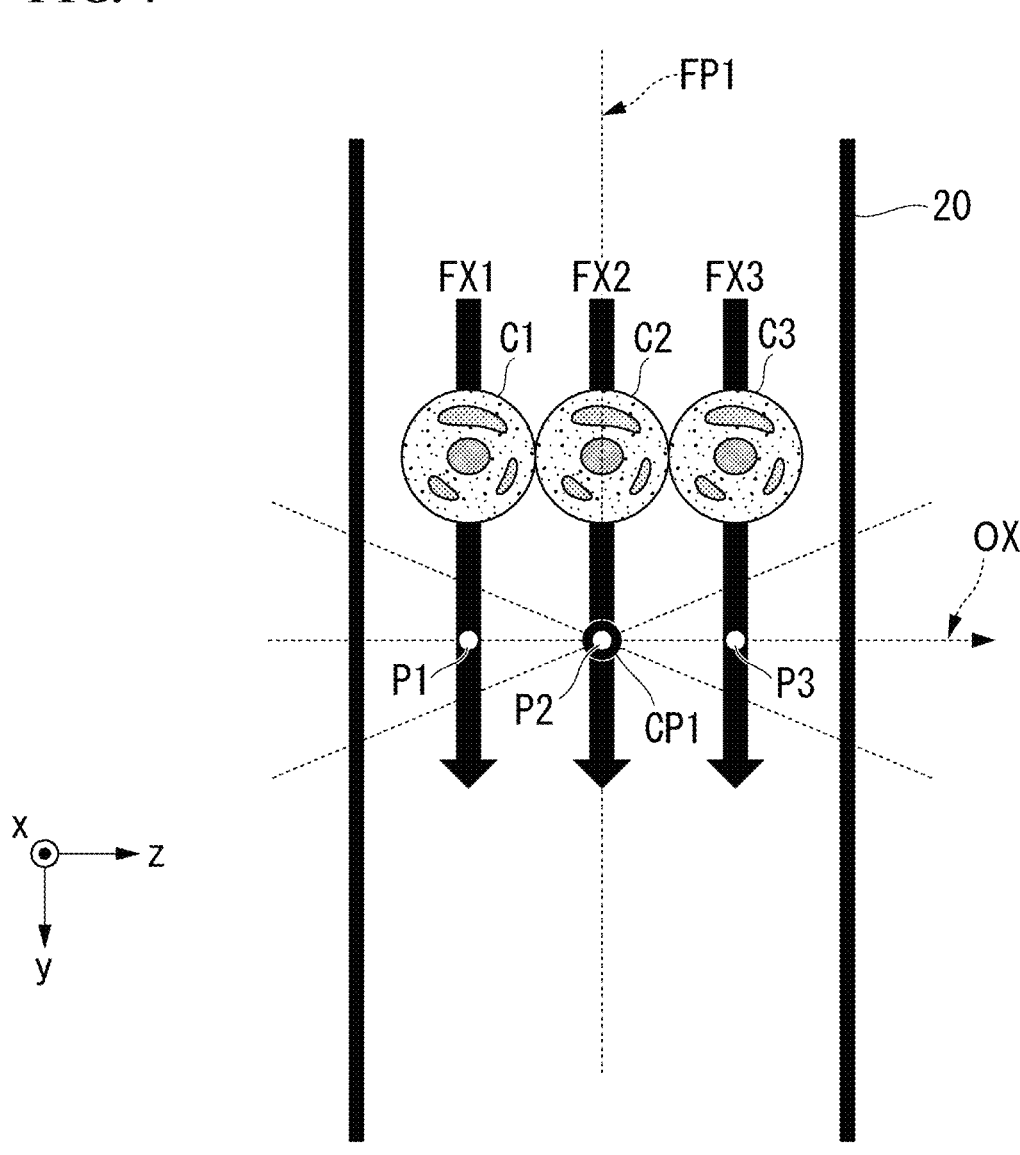
FIG. 4 is a diagram showing an example of a side view of the calibration pattern according to the first embodiment of the present invention.
Figure 5:
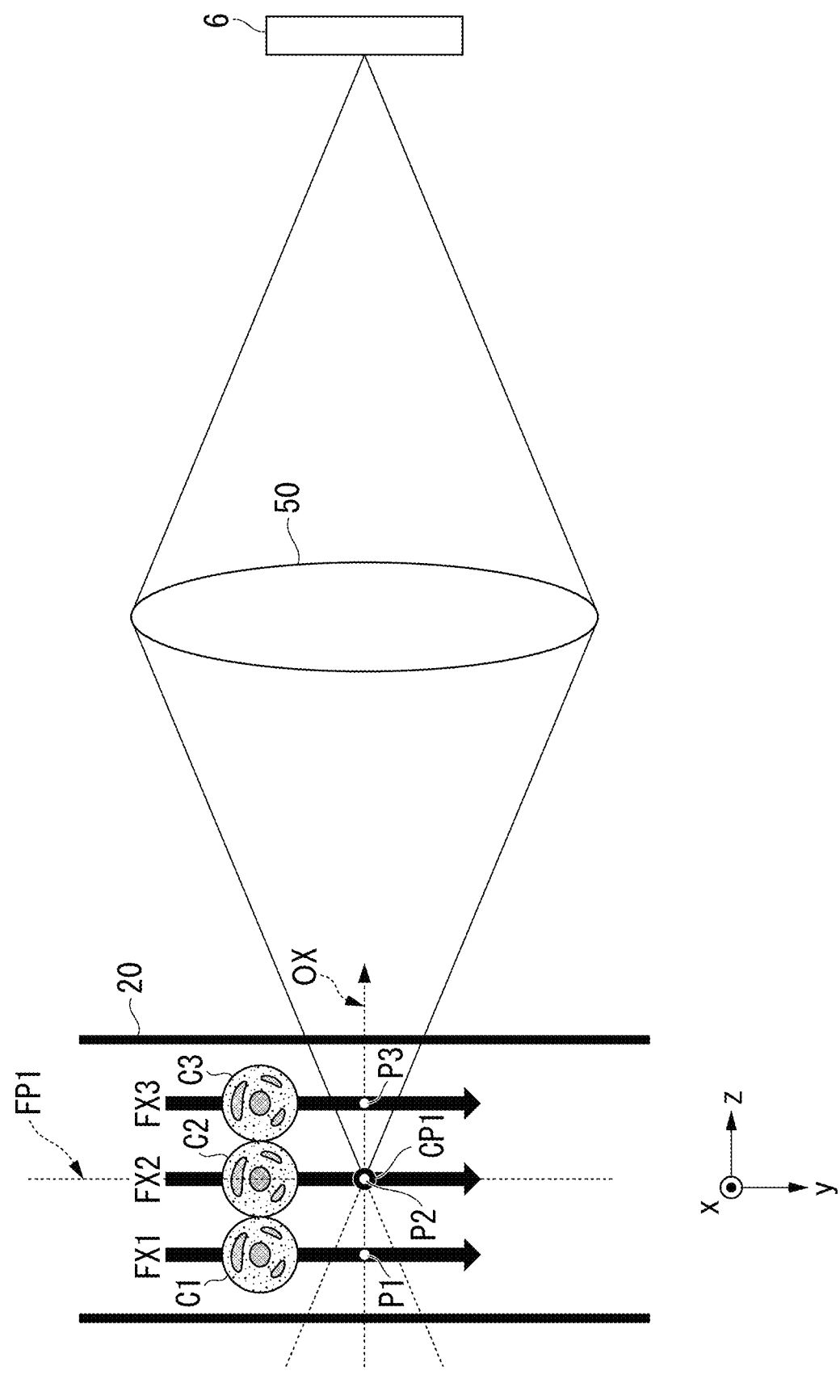
FIG. 5 is a diagram showing an example of a side view of a positional relationship between the calibration pattern and an imaging lens that constitutes a photodetection optical system according to the first embodiment of the present invention.

Here, a calibration pattern CP1 according to the present embodiment will be described with reference to FIGS. 3 to 5. FIG. 3 is a diagram showing an example of a front view of the calibration pattern CP1 irradiated into the flow path 20. The front view is a diagram of the calibration pattern CP1 seen from the direction of the optical axis OX (the z-axis direction). FIG. 4 is a diagram showing an example of a side view of the calibration pattern CP1 irradiated into the flow path 20. The side view is a diagram of the calibration pattern CP1 seen from a horizontal direction HX (the x-axis direction). FIG. 5 is a diagram showing an example of a side view of a positional relationship between the calibration pattern CP1 according to the present embodiment and the imaging lens 50 that constitutes the photodetection optical system 5 (not shown).

In the present embodiment, the calibration pattern CP1 is included in the structured illumination pattern 21 that is irradiated into the flow path 20 and is imaged in the flow path 20 as a part of the structured illumination pattern 21 as described above. As shown in FIG. 3, the calibration pattern CP1 is irradiated into the flow path 20 as a pattern that is in a straight line parallel to the horizontal direction HX (the x-axis direction) when seen from the direction of the optical axis OX (the z-axis direction). The position of the optical information generation pattern included in the structured illumination pattern 21 is not shown in FIG. 3.

FIG. 4 shows the position of the calibration pattern CP1 when seen from the horizontal direction HX (the x-axis direction). The calibration pattern CP1 is imaged on the focal plane FP1 when seen from the horizontal direction HX and is shown as a circle in FIG. 4 for the sake of simplicity. The focal plane FP1 is a focal plane on which the calibration pattern CP1 is imaged in the flow path 20. In FIG. 4, the calibration pattern CP1 is imaged at a position P2 which is a depth position PP of a cell C2 moving in the flow path 20 along a flow line FX2. Similarly, the position of the optical information generation pattern included in the structured illumination pattern 21 is not shown in FIG. 4.

FIGS. 4 and 5 are diagrams of the flow path 20 seen from the horizontal direction HX (the x-axis direction), which show three examples of which depth position a cell C passes through when passing near the detection position. Each cell C moves in the flow path 20 along a flow line of a flowing fluid. A cell C1, a cell C2, and a cell C3 are cells C that move through flow lines (respectively through flow lines FX1, FX2, and FX3) that pass respectively through a position P1, a position P2, and a position P3 which are at different depth positions PP near the detection position. In FIG. 4, the calibration pattern CP1 is imaged in the flow path at the position P2 and the position P1 is farther from the imaging lens 50 (that is, shallower in the flow path in the direction of the optical axis OX) than the position P2 is. The position P3 is closer to the imaging lens 50 (that is, deeper in the flow path in the direction of the optical axis OX) than the position P2 is. The present embodiment will be described assuming that the position P2 is located in the middle of the positions P1 and P3 for the sake of simplicity.

In the present embodiment, the calibration pattern CP is disposed, for example, in the direction of the flow path indicated by the flow line FX (the y-axis direction), upstream of the flow line FX than the optical information generation pattern (not shown). However, it may also be disposed downstream of the flow line FX than the optical information generation pattern.

Relationship Between Signal Light and Depth Position

Figure 6:
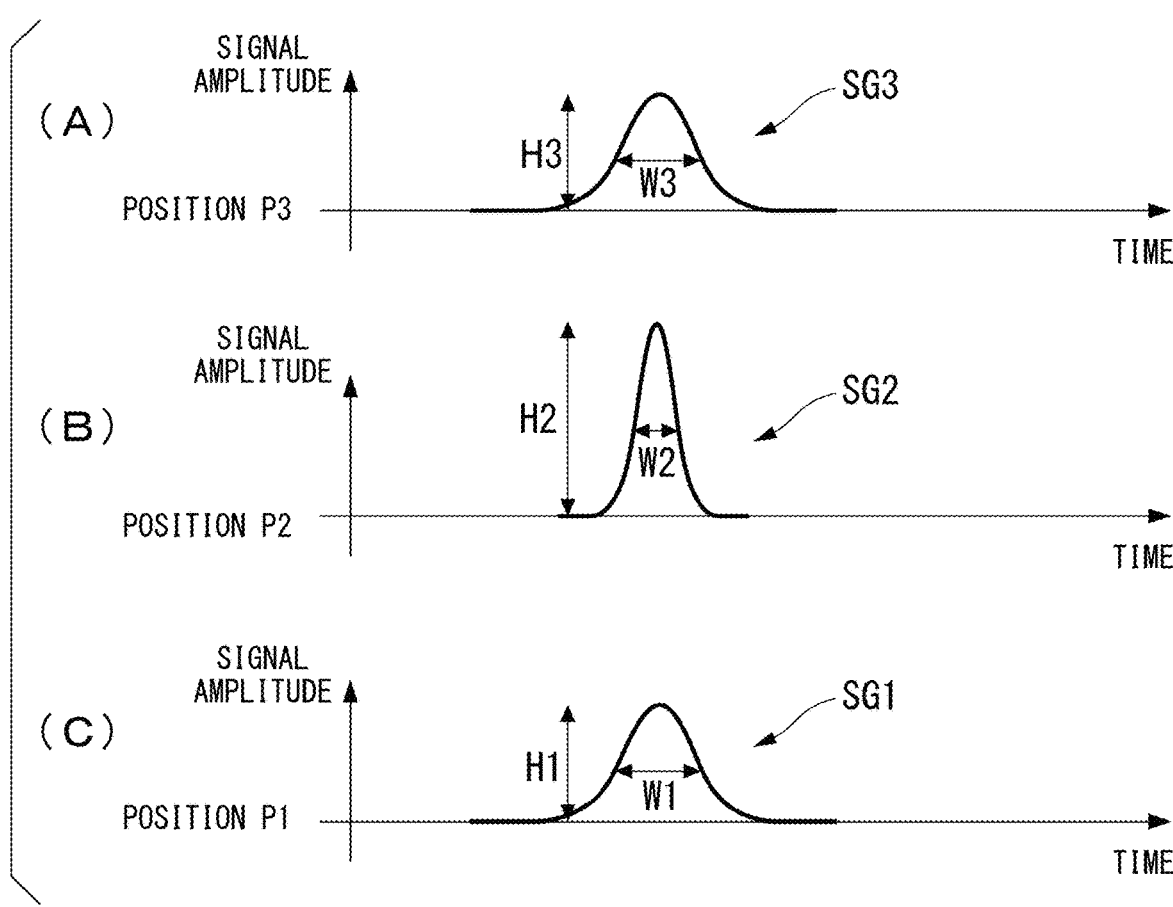
FIG. 6 is a diagram showing an example of a measurement signal indicating a temporal changes in the intensity of signal light according to the first embodiment of the present invention.

Here, the relationship between the signal light LS and the depth position PP will be described with reference to FIGS. 6 and 7. FIG. 6 is a diagram showing an example of a measurement signal SG indicating temporal changes in the intensity of the signal light LS according to the present embodiment. Electronic data indicating temporal changes in the intensity of the signal light LS as a waveform is referred to as a measurement signal SG. FIG. 6(A) shows a measurement signal SG3 for the cell C3 that has moved in the flow path 20 along the flow line FX3 and passed through the position P3. FIG. 6(B) shows a measurement signal SG2 for the cell C2 that has moved in the flow path 20 along the flow line FX2 and passed through the position P2. FIG. 6(C) shows a measurement signal SG1 for the cell C1 that has moved in the flow path 20 along the flow line FX1 and passed through the position P1.

The present embodiment will be described with respect to an example in which a peak value and a peak width of a measurement signal are used as indicators of the intensity of the signal light LS used to calculate the depth position. The peak value of a measurement signal is the maximum value of the amplitude of the measurement signal. The peak width of a measurement signal is, for example, a time width such as a half width (full width half maximum (FWHM)) within which the amplitude of the signal is equal to or greater than a predetermined threshold. The peak width of a measurement signal may be a feature value that indicates the spread in the time direction of the measurement signal obtained by curve fitting (for example, a dispersion in Gaussian curve fitting). Other indicators such as a peak area can also be used as an indicator of the intensity of the signal light LS. In the following description, an indicator of the intensity of the signal light LS used to calculate the depth position will also be referred to as a parameter.

The peak value H3 of the measurement signal SG3 is smaller than the peak value H2 of the measurement signal SG2. On the other hand, the width W3 of the measurement signal SG3 is greater than the width W2 of the measurement signal SG2. The shape of the measurement signal SG1 and the shape of the measurement signal SG3 are the same. Therefore, the peak value H1 of the measurement signal SG1 is equal to the peak value H3 of the measurement signal SG3, and the width W1 of the measurement signal SG1 is equal to the width W3 of the measurement signal SG3.

In the following description, the peak value and width of a measurement signal SG may be collectively referred to as a profile of the measurement signal SG.

Figure 7:
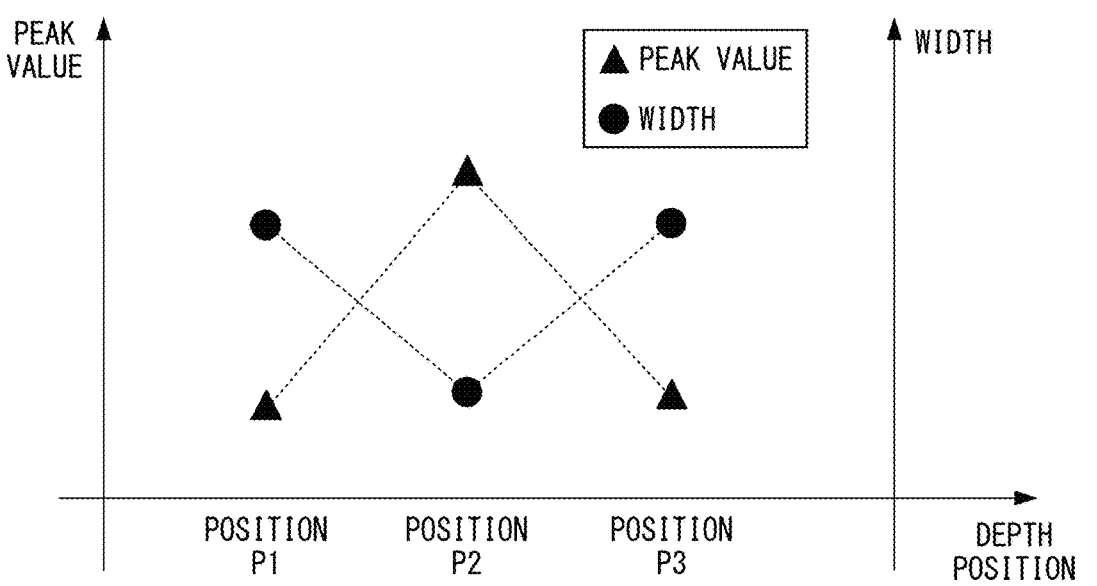
FIG. 7 is a diagram showing an example of a relationship between a depth position and an indicator of the intensity of signal light according to the first embodiment of the present invention.

FIG. 7 shows a relationship between the magnitudes of values included in the profiles of the measurement signal SG1, the measurement signal SG2, and the measurement signal SG3 and the depth positions PP of the cells C. FIG. 7 is a diagram showing an example of the relationship between the depth positions PP and the magnitudes of values included in the profiles of the measurement signals SG according to the present embodiment. FIG. 7 shows an example in which the values included in the profiles of the measurement signals SG are a peak value and a width. The peak value of the measurement signal SG decreases and the width thereof increases as the depth position PP of the cell C moves away in the depth direction from the position P2 which is the position where the calibration pattern CP is imaged in the flow path, compared to the case where the depth position PP of the cell C matches the position P2.

A depth position PP where the peak value of the measurement signal SG is maximized and the width is minimized corresponds to the position P2 where the calibration pattern CP is imaged in the flow path 20. In the example of FIG. 5, the calibration pattern CP1 is imaged at the position whose depth position PP is the position P2. Thus, a positional deviation in the depth direction from the position P2 of a flow line along which a cell C flows can be detected by detecting a difference of the peak value of its measurement signal SG from its maximum value and/or a difference of the width from its minimum value. The positional deviation of a flow line in the depth direction is a relative deviation of the passage position in the flow path 20 of an observation object, which flows together with a fluid flowing through the flow path, in the direction of the depth position PP. At the same time, the positional deviation of a flow line in the depth direction is a relative deviation in the direction of the optical axis OX of the photodetection optical system in the present embodiment.

The positional deviation in the direction of the optical axis OX of a position where an observation object flows in the flow path 20 may also be detected using a new parameter obtained as a result of calculation using two parameters, the peak value and peak width, of a measurement signal SG. For example, a value obtained by multiplying the peak value by the reciprocal of the width is used as a new parameter. In this case, the depth position PP where the new parameter is maximized corresponds to the depth position where the irradiation light of the calibration pattern is imaged in the flow path 20. In that case, a measurement signal SG of signal light LS, which is emitted from a cell C moving along a flow line FX passing through the position (the position P2 in FIG. 5), has a sharp shape with the greatest peak value and the smallest width. The positional deviation of the flow line in the direction of the optical axis OX can be detected by detecting the difference of the new parameter from its maximum value. The positional deviation of the flow line in the direction of the optical axis OX can also be detected by using one of the two parameters or a combination thereof in combination with a new parameter obtained through calculation using the two parameters.

As described above, the flow path 20 through which a cell C passes is irradiated with structured illumination light SLE and the photodetector detects signal light LS that the cell C emits by being irradiated with a calibration pattern CP included in the structured illumination light SLE, whereby it is possible to calculate a depth position PP of the cell C at the same time as optical information IC of the cell C. At this time, the calibration pattern CP for detecting the depth position PP of the cell C included in the structured illumination light SLE is imaged on the focal plane FP1 in the flow path 20. The calibration pattern CP1 is irradiated onto a cell C moving at a certain position in the depth direction along the flow line FX in the flow path 20 and serves as a detection position for detecting the depth position PP which is a position in the depth direction of the flow path where the cell C passes through the flow path 20. In the present specification, "irradiating a calibration pattern CP onto a cell C passing through the flow path 20 and calculating a depth position PP of the cell C using parameters such as the peak value and width of a measurement signal SG indicating temporal changes in the intensity of signal light LS from the cell C as a waveform" as described above can also be expressed as "establishing a detection position for detecting the depth position PP in the flow path 20 at a predetermined position and calculating a depth position through which a cell C passes in a flow path based on the parameter of temporal changes in the intensity of signal light LS detected at the detection position."

Arithmetic Device

Figures 8, 9:
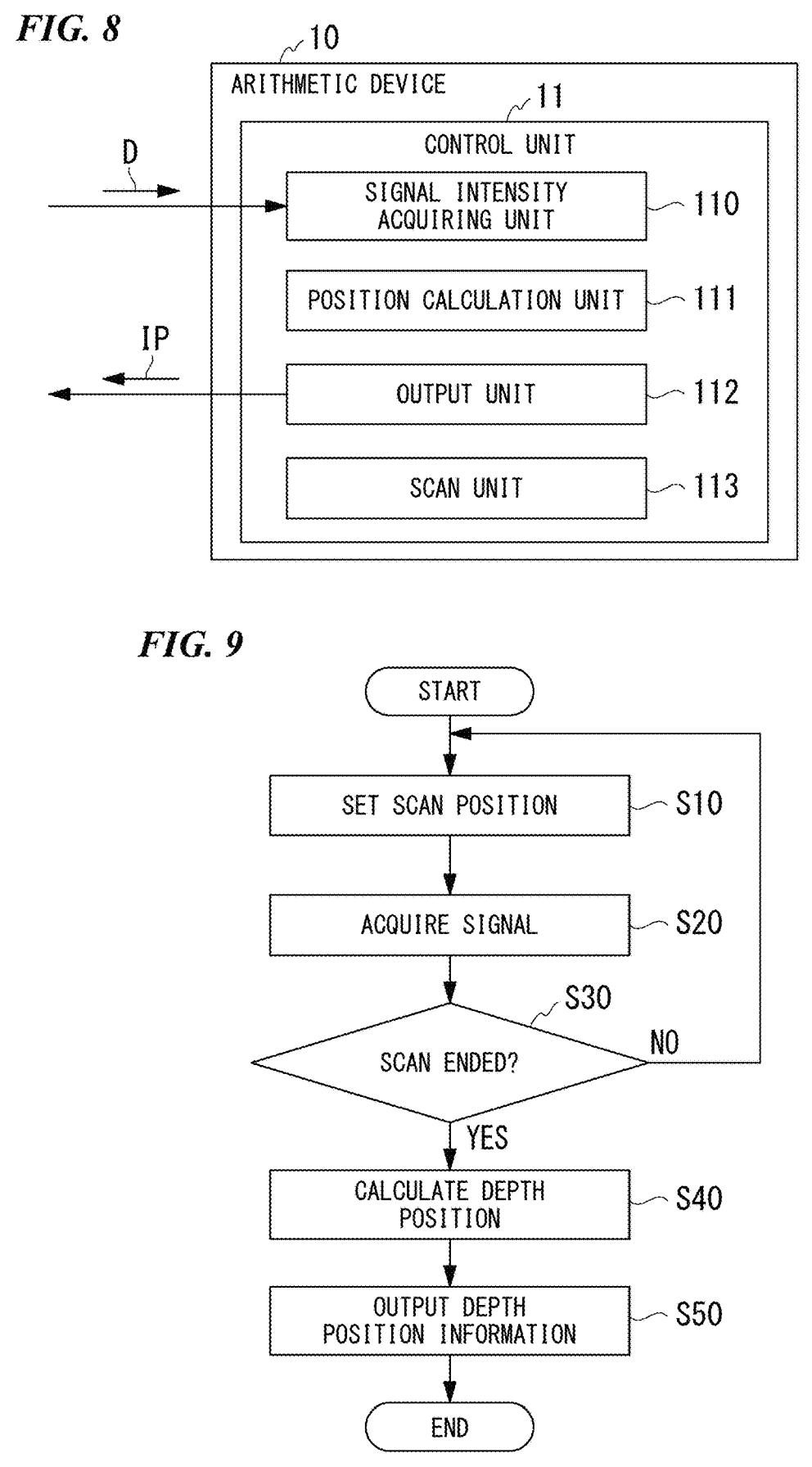

Here, a configuration of the arithmetic device 10 that calculates the depth position PP of a cell C based on the parameter of temporal changes in the intensity of the signal light LS detected at the detection position will be described with reference to FIG. 8. FIG. 8 is a diagram showing an example of a configuration of the arithmetic device according to the present embodiment. In the present embodiment, the arithmetic device 10 is implemented as a function of the PC 8.

The arithmetic device 10 includes a control unit 11. The control unit 11 includes, for example, a central processing unit (CPU), a graphics processing unit (GPU), and a field-programmable gate array (FPGA) and performs various calculations and exchanges information. The control unit 11 includes a signal intensity acquiring unit 110, a position calculation unit 111, an output unit 112, and a scan unit 113. Each of the signal intensity acquiring unit 110, the position calculation unit 111, the output unit 112, and the scan unit 113 is a module implemented, for example, by a CPU reading a program from a read only memory (ROM) and performing processing.

The signal intensity acquiring unit 110 acquires electronic data D output from the DAQ device 7. The electronic data D is electronic data of the measurement signal SG which is temporal changes in the intensity of the signal light LS detected by the photodetector 6 at the calibration pattern CP. In the following description, acquiring the electronic data D is also referred to as acquiring a signal.

The position calculation unit 111 calculates the depth position PP of the cell C based on the electronic data D acquired by the signal intensity acquiring unit 110.

The output unit 112 outputs position information IP indicating the depth position PP calculated by the position calculation unit 111 to the flow path position control device 9.

The scan unit 113 performs a scan process for calculating the depth position PP. This scan process is a process in which the flow path 20 is moved in the direction of the optical axis OX via the flow path position control device 9 and signals are continuously acquired at various positions in the optical axis direction of the flow path 20. Note that in the present embodiment, the direction of the optical axis OX is the depth direction of the flow path 20 and acquiring a signal means acquiring electronic data D of a measurement signal SG.

Position Calculation Process of Arithmetic Device

Next, a position calculation process of the arithmetic device 10 will be described with reference to FIG. 9. FIG. 9 is a diagram showing an example of the position calculation process according to the present embodiment. The arithmetic device 10 performs the steps of the position calculation process described below every predetermined period after cells C start flowing through the flow path 20. The predetermined period is a fixed time period such as, for example, 10 minutes. The arithmetic device 10 may perform the position calculation process each time a predetermined number of cells C flow through the flow path 20 instead of every predetermined period. The predetermined number is, for example, 1000. Such a predetermined period or a predetermined number may be set according to the flow rate of a fluid flowing through the flow path 20.

Step S10: The scan unit 113 sets a predetermined position in the direction of the optical axis OX of the flow path 20 as a scan position. When the scan position has been set, the scan unit 113 moves the position of the flow path 20 in the optical axis direction to the set scan position via the flow path position control device 9. Upon completing the process of moving the flow path 20 to the scan position in the direction of the optical axis OX, the scan unit 113 provides a signal indicating that the process has been completed to the signal intensity acquiring unit 110.

In step S10 that is performed for the first time after the position calculation process starts, the scan unit 113 sets the scan position to a position in the direction of the optical axis OX where the flow path 20 is currently set. In step S10 from the second iteration onward, the scan unit 113 changes the scan position by a predetermined distance from the previous scan position. For example, the scan unit 113 increases the scan position by a predetermined distance from the previous scan position. The predetermined distance is, for example, a distance of about 5 micrometers. The scan unit 113 moves the scan position in the optical axis direction by the aforesaid distance from the scan position of the previous scan process and performs the next signal acquisition.

When the scan position has reached a highest position set for the position in the direction of the optical axis OX of the flow path 20, the scan unit 113 sets, for example, the next scan position to a lowest position set for the position in the direction of the optical axis OX of the flow path 20. Thus, scanning can be performed in both directions toward higher and lower positions from the scan start position to acquire signals.

The scan unit 113 may also decrease the scan position by a predetermined distance from the previous scan position in step S10 from the second iteration onward.

In step S10 that is performed for the first time after the position calculation process starts, the scan unit 113 may also set the scan position to the highest position or the lowest position that can be set for the position in the direction of the optical axis OX of the flow path 20.

Step S20: The signal intensity acquiring unit 110 acquires a signal output from the DAQ device 7 when the process of moving the flow path 20 to the scan position in the direction of the optical axis OX has been completed. That is, the signal intensity acquiring unit 110 acquires electronic data D of a measurement signal SG. The signal intensity acquiring unit 110 provides the acquired electronic data D to the position calculation unit 111.

Step S30: When the signal acquisition has been completed in step S20, the scan unit 113 determines whether or not the scan process has been completed. Upon determining that the scan process has been completed (YES in step S30), the scan unit 113 returns the position of the flow path 20 in the direction of the optical axis OX to the position before starting the scan process via the flow path position control device 9. After that, the control unit 11 performs the processing of step S40.

On the other hand, when the scan unit 113 has determined that the scan process has not been completed (NO in step S30), the control unit 11 returns to step S10 to change the scan position and performs the step of acquiring a signal again. Note that signal acquisition is performed in the scan process a preset number of times. The preset number of times is, for example, about five times.

Step S40: The position calculation unit 111 calculates the depth position PP of the cell C based on the electronic data D acquired by the signal intensity acquiring unit 110 in the scan process. The position calculation unit 111 provides position information IP indicating the calculated depth position PP to the output unit 112. The signal intensity acquiring unit 110 generates one measurement signal SG for one cell C as electronic data indicating the time-course waveform of the intensity of signal light.

Based on the electronic data D, the position calculation unit 111 compares a peak value of a measurement signal SG at the depth position PP where the peak value of the measurement signal SG is maximized with a peak value of the measurement signal SG obtained at the current position in the optical axis direction of the flow path 20. Based on the electronic data D, the position calculation unit 111 also compares a width of a measurement signal SG at the depth position PP where the width of the measurement signal SG is minimized with a width of the measurement signal SG obtained at the current position in the depth direction of the flow path 20.

Based on the compared results, the position calculation unit 111 calculates the depth position PP of the cell C as a relative position to the position P2 where the calibration pattern CP is imaged in the flow path 20. Here, the peak value of the measurement signal SG is maximized when the depth position PP matches the position P2 where the calibration pattern CP is imaged in the flow path 20 as described above. Also, the width of the measurement signal SG is minimized when the depth position PP matches the position P2 where the calibration pattern CP is imaged in the flow path 20.

Here, the position calculation unit 111 calculates the depth position PP of the cell C based on the electronic data D as described above. The electronic data D here is a measurement signal SG that is electronic data regarding the waveform of temporal changes in the intensity of the signal light LS detected at the detection position of the calibration pattern CP. That is, the position calculation unit 111 calculates the depth position PP, which is a relative position of the cell C in the direction of the optical axis OX of the flow path 20, using the parameter of temporal changes in the intensity of the signal light LS detected at the detection position.

Although the present embodiment has been described with respect to an example in which the position calculation unit 111 calculates the depth position PP based on both the peak value and the width of the measurement signal SG, the present invention is not limited to this. The position calculation unit 111 may calculate the depth position PP based on at least one of the peak value or the width of the measurement signal SG.

Step S50: The output unit 112 outputs position information IP indicating the depth position PP calculated by the position calculation unit 111 to the flow path position control device 9.

Then, the arithmetic device 10 ends the position calculation process.

Upon acquiring the position information IP from the output unit 112, the flow path position control device 9 controls the position in the depth direction, that is, the position in the direction of the optical axis OX, of the flow path 20 based on the acquired position information IP. If the depth position PP indicated by the position information IP deviates from the position P2 where the calibration pattern CP irradiated into the flow path 20 is imaged, the flow path position control device 9 changes the position in the depth direction of the flow path 20 such that, for example, the position in the depth direction of the flow path matches the position of the focal plane FP1. That is, the flow path position control device 9 performs feedback control with respect to the positional deviation in the depth direction of the flow path of the flow line FX along which the cell moves.

As described above, the flow path position control device 9 controls the position in the depth direction of the flow path 20 based on the position information IP indicating the depth position PP output by the output unit 112 and changes the position in the depth direction of the flow path 20 such that, for example, the depth position PP indicated by the position information IP matches the position of the calibration pattern CP1 where illumination light irradiated into the flow path 20 is imaged.

Although the above position calculation process has been described with respect to an example in which the position calculation unit 111 calculates the depth position PP after the scan process is completed, the present invention is not limited to this. The position calculation unit 111 may calculate the depth position PP each time the signal intensity acquiring unit 110 acquires a signal in parallel with the scan process.

In that case, the position calculation unit 111 determines a maximum value of the peak value or a minimum value of the width for the profile of the measurement signal SG in parallel with the scan process. The scan unit 113 ends the scan process when the position calculation unit 111 is able to determine the maximum value of the peak value or the minimum value of the width for the profile of the measurement signal SG.

When the position calculation unit 111 calculates the depth position PP in parallel with the scan process, the scan unit 113 may change the scan position according to an increase or decrease in the peak value or width of the measurement signal SG. In that case, for example, if the peak value of the measurement signal SG tends to decrease, the scan unit 113 sets the next scan position in a direction opposite to the direction in which it has been currently changing the scan position. Alternatively, if the width of the measurement signal SG tends to increase, the scan unit 113 sets the next scan position in a direction opposite to the direction in which it has been currently changing the scan position.

The position calculation unit 111 may also determine a local maximum value of the peak value or a local minimum value of the width for the profile of the measurement signal SG, instead of the maximum value of the peak value or the minimum value of the width. In that case, the scan unit 113 ends the scan process when the position calculation unit 111 is able to determine the local maximum value of the peak value or the local minimum value of the width for the profile of the measurement signal SG.

Although the above position calculation process has been described with respect to an example in which one measurement signal SG is generated for one cell C, the present invention is not limited to this. The position calculation unit 111 may generate an average of measurement signals for a predetermined number of cells C as a measurement signal SG.

Although an example in which the depth position PP is calculated as a relative position to the position where the calibration pattern CP irradiated into the flow path 20 is imaged has been described above, the present invention is not limited to this. The depth position PP may be calculated as an absolute position by comparison with a profile of a premeasured measurement signal SG. In that case, for example, the profile of the premeasured measurement signal SG is measured by setting the position in the depth direction of a flow path 20 in advance such that a position where a cell moves along a flow line FX matches a position where a calibration pattern CP is imaged within the flow path. The arithmetic device 10 stores the profile of the premeasured measurement signal SG.

The above position calculation process has been described with respect to an example in which the position information IP is output to the flow path position control device 9 and feedback control is performed with respect to the positional deviation of the flow line. However, the present invention is not limited to this. A process of notifying of the positional deviation of the flow line may be performed instead of the feedback control with respect to the positional deviation of the flow line. When the process of notifying of the positional deviation of the flow line is performed, the output unit 112 outputs the position information IP to a notifying unit that notifies of the positional deviation of the flow line. The notifying unit notifies of the positional deviation of the flow line upon determining that a positional deviation of a flow line has occurred based on the position information IP.

Although the present embodiment has been described with respect to an example in which the structured illumination pattern 21 includes an optical information generation pattern and a calibration pattern CP and illumination light for the optical information generation pattern and illumination light for the calibration pattern CP are irradiated at the same time, the present invention is not limited to this. In a modification of the present embodiment, illumination light for the optical information generation pattern and illumination light for the calibration pattern CP may be irradiated at different times for each other. For example, the structured illumination pattern 21 may be irradiated separately such that the calibration pattern CP of the structured illumination pattern 21 is used only at the calibration time in which a flow line deviation of a cell C in the flow path 20 is measured and the optical information generation pattern is used only at the time of identifying cells C. Namely, illumination light for the calibration pattern CP may be illuminated during calibration and illumination light for the optical information generation pattern may be illuminated when identifying cells C. In the illumination light irradiation of this modification, it is also possible that the calibration pattern CP is illuminated as an unstructured illumination pattern. With the configuration of this modification, the range of structured illumination that is irradiated at the time of identifying cells C can be reduced, compared to the case where illumination light for the optical information generation pattern and illumination light for the calibration pattern CP are irradiated at the same time. Thereby, improving the throughput of the flow cytometer 1 becomes possible by the configuration.

Summary of First Embodiment

As described above, the flow cytometer 1 according to the present embodiment includes a microfluidic device 2 including a flow path 20 through which an observation object (a cell C in the present embodiment) can flow together with a fluid, an imaging lens 50 that images signal light LS from the observation object (the cell C in the present embodiment), a photodetector 6 that detects the intensity of the signal light LS from the observation object (the cell C in the present embodiment) in time series, an information generation device (the PC8 in the present embodiment) that generates optical information IC indicating any one or more of the shape, form, or structure of the observation object (the cell C in the present embodiment) based on the intensity of the signal light LS detected by the photodetector 6, and an arithmetic device (the PC8 in the present embodiment).

In the microfluidic device 2, a detection position (a calibration pattern CP in the present embodiment) for detecting a depth position PP, which is a position in the depth direction through which an observation object (a cell C in the present embodiment) passes in the flow path 20, is disposed in the flow path 20.

The arithmetic device (the PC 8 in the present embodiment) includes a signal intensity acquiring unit 110, a scan unit 113, a position calculation unit 111, and an output unit 112.

The signal intensity acquiring unit 110 acquires electronic data D (a measurement signal SG in the present embodiment) of temporal changes in the intensity of the signal light LS detected at a detection position (the position of the calibration pattern CP1 in the present embodiment) predetermined in the flow path 20 to detect the depth position PP.

The scan unit 113 performs a scan process in which the flow path 20 is moved in the depth direction via the flow path position control device 9 and electronic data D is acquired at different depth positions.

The position calculation unit 111 calculates the depth position PP based on the electronic data D.

The output unit 112 outputs position information IP indicating the depth position PP calculated by the position calculation unit 111.

With this configuration, in the flow cytometer 1 according to the present embodiment, a detection position for detecting the depth position PP can be established at a predetermined position in the flow path 20 and the depth position PP can be calculated using the parameter of temporal changes in the intensity of the signal light LS detected at the detection position. Therefore, it is possible to detect the variation in the depth direction of the passage position of the observation objects when they pass through the flow path with the configuration.

In the flow cytometer 1 according to the present embodiment, a detection position for detecting the depth position PP is established in the flow path 20, the observation object is irradiated with illumination light that is imaged at the position, and temporal changes in the intensity of signal light LS emitted from the observation object is detected, whereby it is possible to directly measure the depth position PP of the observation object through which it passes in the flow path using a simple configuration.

In addition, in the flow cytometer 1 according to the present embodiment, the position calculation unit 111 calculates the depth position PP using any one or more of parameters such as a peak value, a width, or an area of the temporal changes in the intensity of the signal light LS (the measurement signal SG in the present embodiment).

With this configuration, the flow cytometer 1 according to the present embodiment can calculate the depth position PP based on at least one of the peak value or the width of the temporal changes in the intensity of the signal light LS as information corresponding to the depth position PP and therefore it is possible to easily detect the passage position in the depth direction of the observation object where it passes through the flow path, compared to when it is not based on at least one of the peak value or the width of the change over time in the intensity of the signal light LS.

Further, in the flow cytometer 1 according to the present embodiment, common structured light is used for both the light to illuminate the detection position (the position of the calibration pattern CP1 in the present embodiment) for detecting the depth position PP with the photodetector 6 and light used for the illumination to generate the optical information IC indicating the morphological information of the observation object (the cell C in the present embodiment).

With this configuration, in the flow cytometer 1 according to the present embodiment, the detection position for detecting the depth position PP can be established by being included in the structured illumination for acquiring the optical information IC of the observation object and therefore a plurality of detection positions for detecting the depth position PP can be established without separately providing optical systems for setting a plurality of detection positions for detecting the depth position PP.

Furthermore, the flow cytometer 1 according to the present embodiment includes a flow path position control device 9. The flow cytometer 1 performs a scan process in which the flow path 20 is moved in the direction of the optical axis OX by the flow path position control device 9 and signals are continuously acquired at various positions in the optical axis direction of the flow path 20 to calculate the depth position PP. The flow path position control device 9 further controls the position in the depth direction of the flow path 20 based on information indicating the depth position PP output by the output unit 112.

With this configuration, the flow cytometer 1 according to the present embodiment can control the position in the depth direction of the flow path 20 based on the information indicating the depth position PP and therefore positional deviations that occur in the depth direction in measurement of observation objects can be corrected in a timely manner.

Second Embodiment

Hereinafter, a second embodiment of the present invention will be described in detail with reference to the drawings.

The first embodiment has been described with respect to the case where one calibration pattern CP is disposed in the flow path at a detection position in order to detect a depth position PP through which a cell passes in the flow path 20. The present embodiment will be described with respect to the case where a plurality of calibration patterns CP are disposed in a flow path.

A flow cytometer according to the present embodiment is referred to as a flow cytometer 1a and the flow path is referred to as a flow path 20a. A photodetection optical system according to the present embodiment is referred to as a photodetection optical system 5a and an imaging lens that constitutes the photodetection optical system 5a is referred to as an imaging lens 50a. An arithmetic device according to the present embodiment is referred to as an arithmetic device 10a.

The configuration of the flow cytometer 1a according to the present embodiment and the configuration of the flow cytometer 1 according to the first embodiment are similar, except that the number of calibration patterns CPa in the flow path 20a differs, calibration patterns CPa are disposed at respective positions in different focal planes from each other where structured illumination light irradiated into the flow path 20a is imaged in the flow path, and the position calculation process of the arithmetic device 10a differs from the position calculation process of the arithmetic device 10. Description of the same functions as in the first embodiment will be omitted and the description of the second embodiment will focus on parts that differ from the first embodiment.

Calibration Pattern

Figure 10:
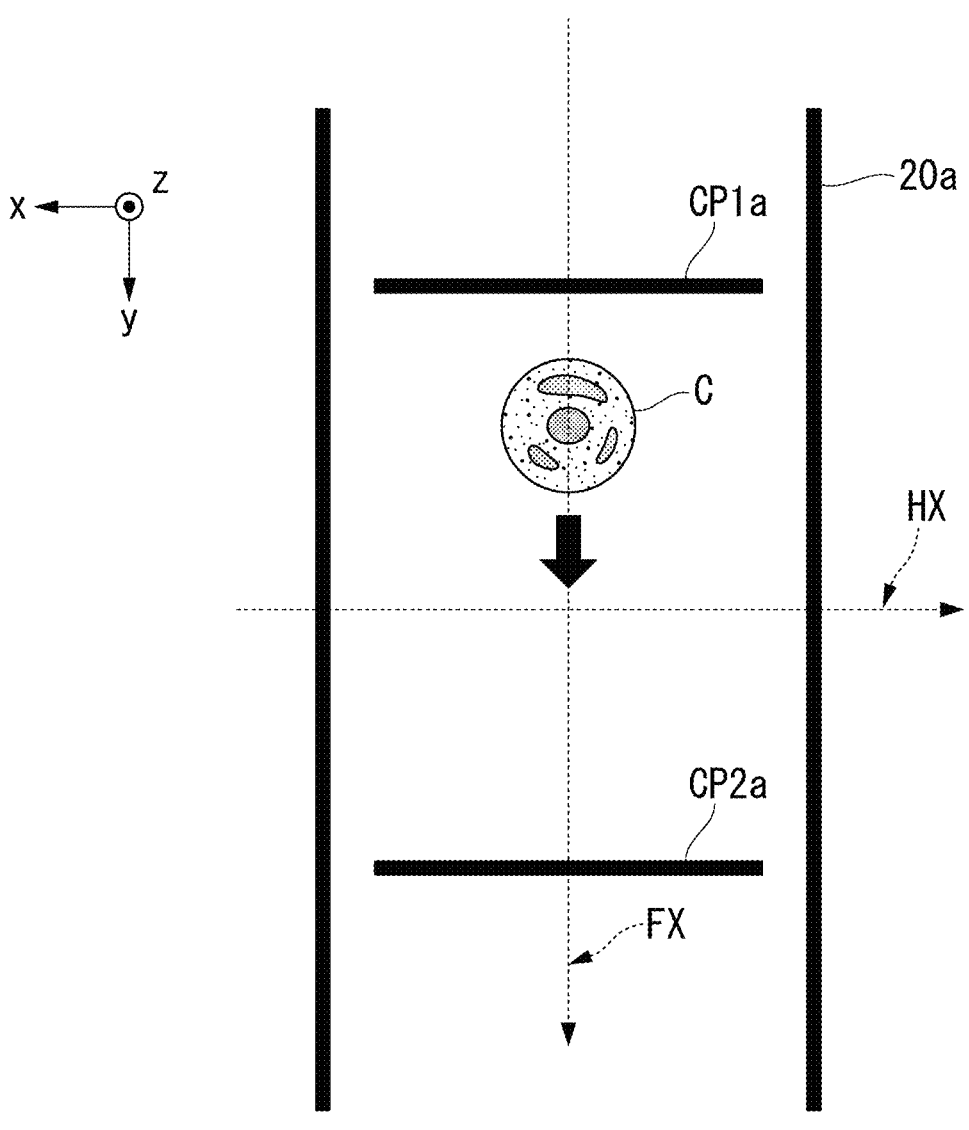
FIG. 10 is a diagram showing an example of a front view of calibration patterns according to a second embodiment of the present invention.
Figure 11:
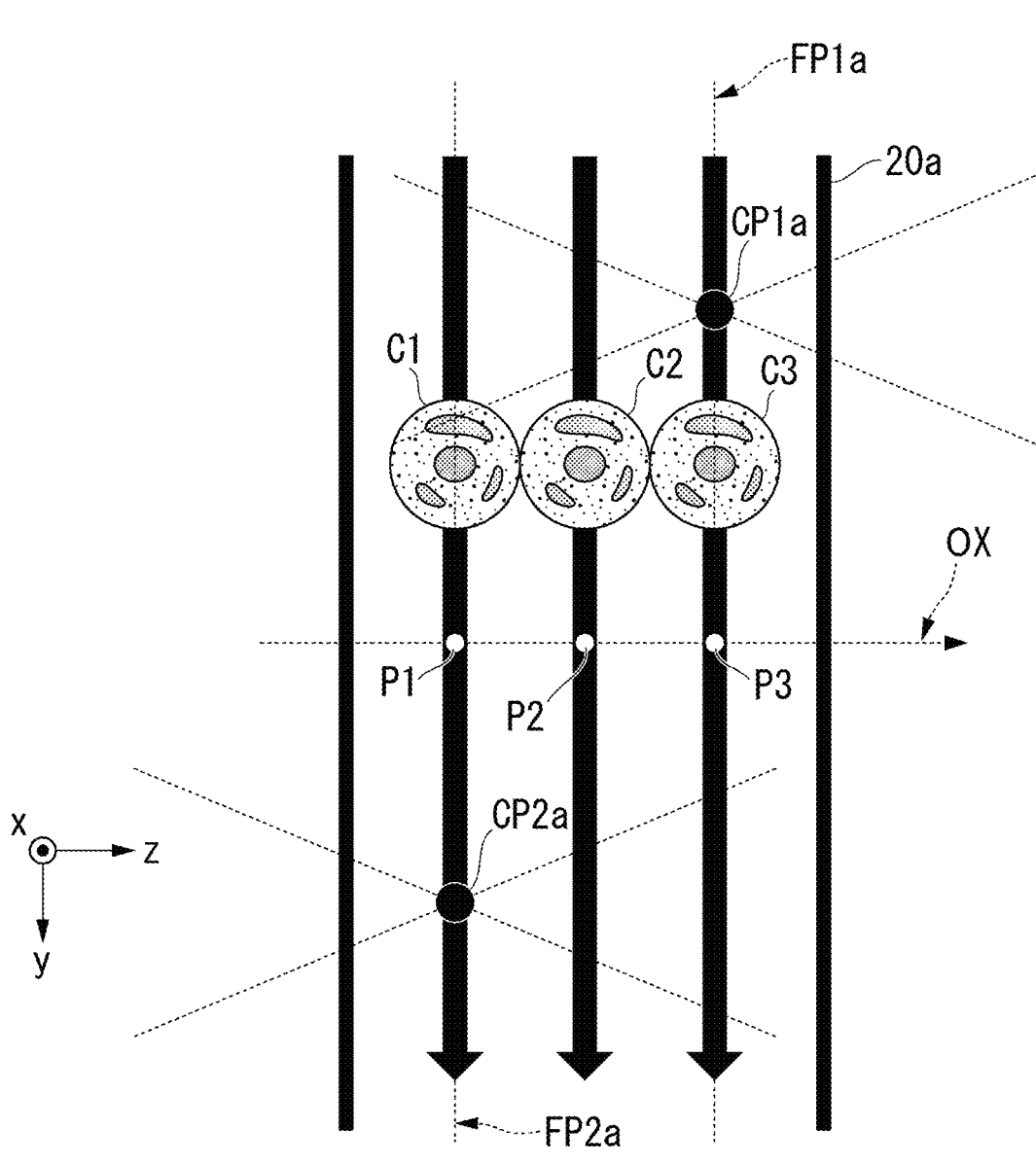
FIG. 11 is a diagram showing an example of a side view of the calibration patterns according to the second embodiment of the present invention.

FIG. 10 is a diagram showing an example of a front view of calibration patterns CPa (a view of the flow path 20a seen from the z-axis direction) according to the present embodiment. FIG. 11 is a diagram showing an example of a side view of the calibration patterns CPa (a view of the flow path 20a seen from the x-axis direction) according to the present embodiment. FIGS. 10 and 11 show an example in which there are two calibration patterns CPa irradiated into the flow path 20a. The position of an optical information generation pattern included in structured illumination pattern 21 is not shown in FIG. 10, similar to FIG. 3 described above.

As shown in FIG. 10, the calibration patterns CPa consist of two calibration patterns, a calibration pattern CP1a and a calibration pattern CP2a. The calibration pattern CP1a and the calibration pattern CP2a are patterns in the form of straight lines extending in the width direction of the flow path 20a and are disposed substantially parallel to the horizontal direction HX (the x-axis direction). The calibration pattern CP1a and the calibration pattern CP2a are disposed at different positions in the direction of flow lines FX (the y-axis direction) along which cells C move in the flow path 20a, which is the longitudinal direction of the flow path.

Note that the calibration pattern CP1a and the calibration pattern CP2a may be disposed either upstream or downstream of the optical information generation pattern (not shown) in the longitudinal direction of the flow path, but it is preferable that the optical information generation pattern be disposed between the calibration pattern CP1a and the calibration pattern CP2a.

FIG. 11 is a diagram showing an example of a side view of the calibration patterns CPa irradiated into the flow path 20a. The position of the optical information generation pattern included in the structured illumination pattern 21 is not shown in FIG. 11, similar to FIG. 10.

The calibration patterns CPa when seen from the horizontal direction HX (the x-axis direction) are imaged at different focal planes FPa in the flow path. In FIG. 11, the calibration pattern CP1a imaged on the focal plane FP1a and the calibration pattern CP2a imaged on the focal plane FP2a are shown as circles for the sake of simplicity. The focal planes FPa are focal planes in which the calibration patterns CPa are imaged in the flow path 20a. The calibration pattern CP1a and the calibration pattern CP2a are disposed in the flow path 20a at different focal planes in the direction of the optical axis OX (the z-axis direction) and have different depth positions PP from each other in the flow path. FIG. 11 shows examples of a cell C1 passing through the flow path 20a along a flow line FX1 whose depth position PP is a position P1, a cell C2 passing through the flow path 20a along a flow line FX2 whose depth position PP is a position P2, and a cell C3 passing through the flow path 20a along a flow line FX3 whose depth position PP is a position P3. Here, the depth position PP of the calibration pattern CP1a is the position P3 through which the cell C3 passes in the flow path along the flow line FX3. The depth position PP of the calibration pattern CP2a is the position P1 through which the cell C1 passes along the flow line FX1. The position P2 through which the cell C2 passes along the flow line FX2 is at an intermediate depth position between the position P1 and the position P3 in the depth direction of the flow path 20a.

In the present embodiment, the calibration pattern CP1a and the calibration pattern CP2a are disposed in the flow path 20a at different positions from each other in the depth direction of the flow path 20a (the direction of the optical axis OX in the present embodiment) and in the longitudinal direction of the flow path 20a as a plurality of detection positions for detecting the depth position PP as described above.

Relationship Between Signal Light and Depth Position

Figure 12:
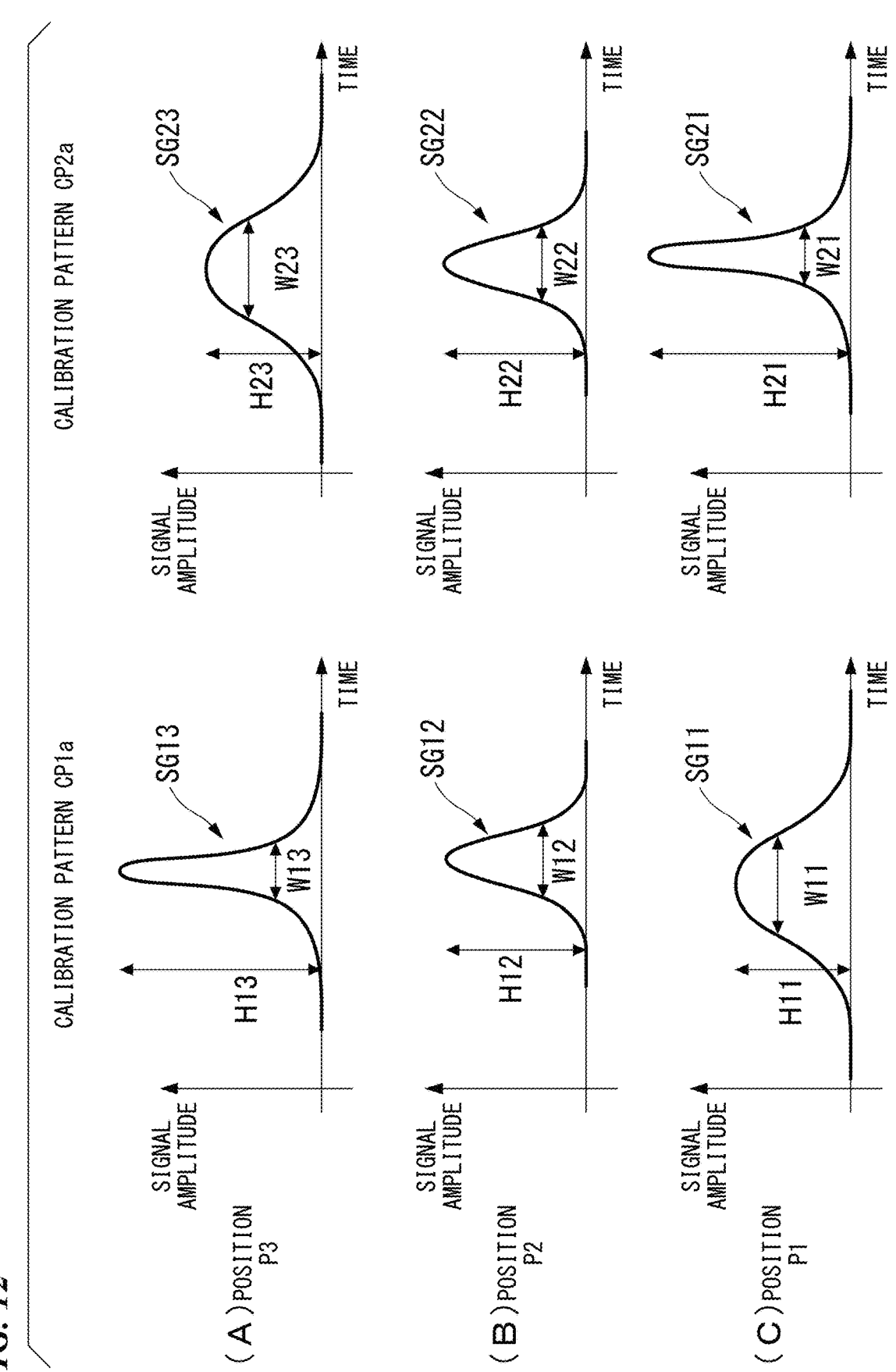
FIG. 12 is a diagram showing an example of a measurement signal showing temporal changes in the intensity of signal light according to the second embodiment of the present invention.

Here, the relationship between the signal light LS and the depth position PP in the second embodiment will be described with reference to FIGS. 12 and 13. FIG. 12 is a diagram showing an example of a measurement signal SG indicating temporal changes in the intensity of the signal light LS according to the second embodiment. The signal light LS here is signal light emitted from a cell C, which is moving in the flow path 20a, by being irradiated with a calibration pattern CPa.

FIG. 12(A) shows a measurement signal SG13 detected by the calibration pattern CP1a established in the flow path 20a and a measurement signal SG23 detected by the calibration pattern CP2a when a cell C passes through the position P3 as a depth position PP in the flow path 20a. FIG. 12(B) shows a measurement signal SG12 detected by the calibration pattern CP1a established in the flow path 20a and a measurement signal SG22 detected by the calibration pattern CP2a when a cell C passes through the position P2 as a depth position PP in the flow path 20a. FIG. 12(C) shows a measurement signal SG11 detected by the calibration pattern CP1a established in the flow path 20a and a measurement signal SG21 detected by the calibration pattern CP2a when a cell C passes through the position P1 as a depth position PP in the flow path. Here, a measurement signal SG detected by a calibration pattern CPa, which is established in the flow path 20a, is a measurement signal SG obtained by irradiating an irradiation position in the flow path 20a with illumination light including a calibration pattern CPa for measuring the depth position of a cell C, which is imaged at a preset position in the flow path 20a, and detecting signal light emitted from the cell C by being irradiated with the illumination light with a photodetector.

In the example of FIG. 12, the measurement signal SG13 and the measurement signal SG21 have the same shape. The measurement signal SG12 and the measurement signal SG22 have the same shape. The measurement signal SG11 and the measurement signal SG23 have the same shape.

The peak values of the measurement signal SG13, the measurement signal SG12, and the measurement signal SG11 are in decreasing order, with the measurement signal SG13 having the highest peak value, followed by the measurement signal SG12, and then the measurement signal SG11. The widths of the measurement signal SG13, the measurement signal SG12, and the measurement signal SG11 are in increasing order, with the measurement signal SG13 having the smallest width, followed by the measurement signal SG12, and then the measurement signal SG11.

The peak values and widths of signals measured for a measurement signal SG detected by the calibration pattern CP1a and a measurement signal SG detected by the calibration pattern CP2a vary depending on a depth position PP at which a cell C passes in the flow path.

In the following description, the ratio of the peak value of a measurement signal SG detected by the calibration pattern CP1a to the peak value of a measurement signal SG detected by the calibration pattern CP2a is referred to as a peak value ratio R1. Also, the ratio of the width of a measurement signal SG detected by the calibration pattern CP1a to the width of a measurement signal SG detected by the calibration pattern CP2a is referred to as a width ratio R2.

Figure 13:
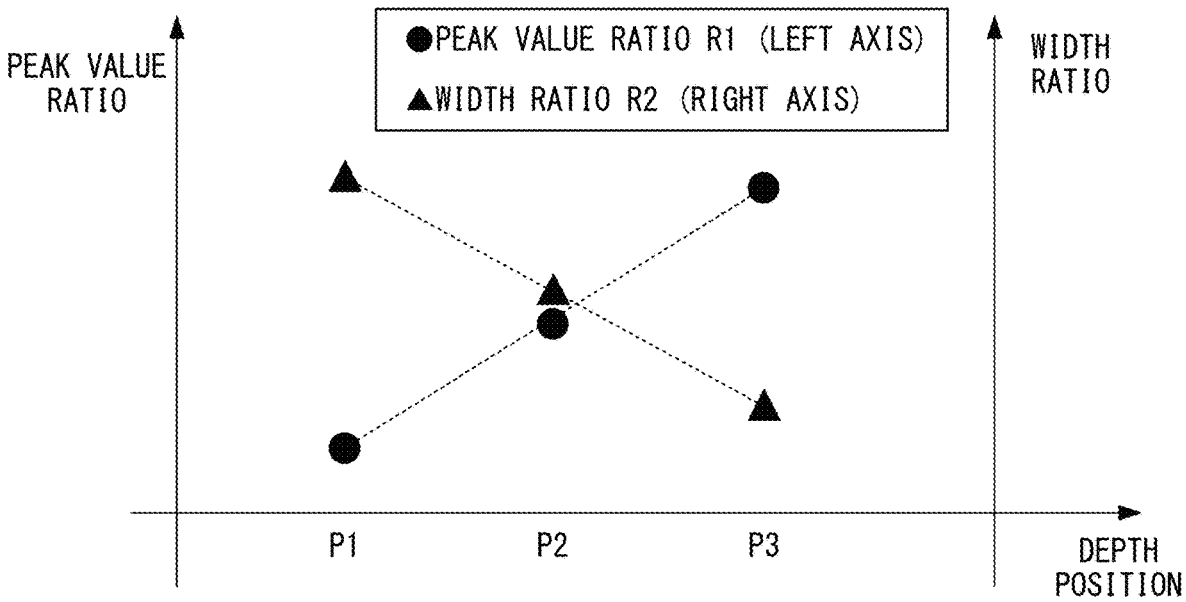
FIG. 13 is a diagram showing an example of a relationship between a peak value ratio and a depth position and a relationship between a width ratio and the depth position according to the second embodiment of the present invention.

A relationship between the depth position PP and the peak value ratio R1 or the width ratio R2 of measurement signals SG detected at a plurality of detection positions is shown in FIG. 13. FIG. 13 is a diagram showing an example of the relationship between the peak value ratio R1 of measurement signals SG and the depth position PP and the relationship between the width ratio R2 and the depth position PP according to the present embodiment.

It can be seen from FIG. 13 that each of the peak value ratio R1 and the width ratio R2 of measurement signals SG changes depending on the depth position PP of the cell C. The peak value ratio R1 of measurement signals SG monotonically decreases as the depth position PP of the cell C becomes shallower from the position P3 to the position P1. On the other hand, the width ratio R2 of measurement signals SG monotonically increases as the depth position PP of the cell C becomes shallower from the position P3 to the position P1.

Namely, the peak value ratio R1 and the width ratio R2 of measurement signals SG each have a one-to-one correspondence with the depth position PP of the cell C. Thus, the depth position PP of the cell C can be calculated based on the peak value ratio R1 and the width ratio R2 of measurement signals SG.

Although the above description describes an example in which a peak value and a peak width of a measurement signal are used as indicators of the intensity of signal light LS used to calculate the depth position, the present invention is not limited to this. A peak area can also be used as an indicator of the intensity of the signal light LS. Although an example in which the number of calibration patterns is two has been described, a larger number of calibration patterns can also be used.

Position Calculation Process of Arithmetic Device

Figure 14:
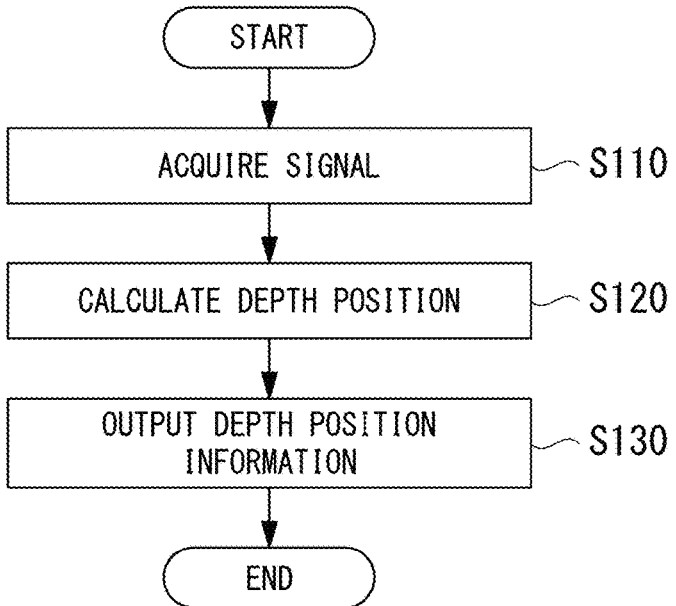
FIG. 14 is a diagram showing an example of a position calculation process according to the second embodiment of the present invention.

Next, a position calculation process of the arithmetic device 10a will be described with reference to FIG. 14. FIG. 14 is a diagram showing an example of the position calculation process according to the present embodiment. The processing of steps S110 and S130 is the same as the processing of steps S20 and S50 in FIG. 9 and thus description thereof will be omitted. A position calculation unit included in the arithmetic device 10a is referred to as a position calculation unit 111a. Components of the arithmetic device 10a other than the position calculation unit 111a are the same as those of the arithmetic device 10.

Step S120: The position calculation unit 111a calculates a depth position PP of a cell C based on electronic data D acquired by the signal intensity acquiring unit 110. The position calculation unit 111a provides position information IP indicating the calculated depth position PP to the output unit 112.

Based on the electronic data D, the position calculation unit 111a calculates the depth position PP based on at least one of a peak value ratio R1 and a width ratio R2. The position calculation unit 111a compares the peak value ratio R1 and a predetermined value for the peak value ratio R1 and calculates the depth position PP based on the difference between the peak value ratio R1 and the predetermined value for the peak value ratio R1. The position calculation unit 111a also compares the width ratio R2 and a predetermined value for the width ratio R2 and calculates the depth position PP based on the difference between the width ratio R2 and the predetermined value for the width ratio R2.

Here, the arithmetic device 10a can use peak value ratio or width ratio values measured in advance as the predetermined value for the peak value ratio R1 and the predetermined value for the width ratio R2, in which case the values are stored.

The position calculation unit 111a may calculate a new parameter obtained as a result of calculation using the peak value ratio R1 and the width ratio R2 based on the electronic data D and calculate the depth position PP based on the calculated parameter. The new parameter is, for example, a value obtained by multiplying the peak value ratio R1 by the reciprocal of the width ratio R2.

For example, the position calculation unit 111a calculates an average value of the depth position PP calculated based on the peak value ratio R1 and the depth position PP calculated based on the width ratio R2 as a depth position PP. The position calculation unit 111a may also set at least one of the depth position PP calculated based on the peak value ratio R1 and the depth position PP calculated based on the width ratio R2 as a depth position PP.

The peak value ratio R1 and the width ratio R2 are values based on a measurement signal SG detected at the calibration pattern CP1a and a measurement signal SG detected at the calibration pattern CP2a as described above. Thus, in the flow cytometer 1a according to the present embodiment, each signal light LS is detected at each of a plurality of detection positions for detecting the depth position PP and the position calculation unit 111 calculates the depth position PP using a parameter derived from a plurality of detected measurement signals SG.

Summary of Second Embodiment

In the flow cytometer 1a according to the present embodiment, a plurality of detection positions that are at different positions in the direction of the optical axis OX and in the longitudinal direction of the flow path 20a (the positions of the calibration pattern CP1a and the calibration pattern CP2a in the present embodiment) are disposed in the flow path 20a and illumination light of calibration patterns CPa, which are irradiated to detect the depth position PP of a cell C, is imaged at the positions as described above.

Signal light LS, which is emitted from the cell C by being irradiated with the calibration patterns CPa, is detected at each of the plurality of detection positions (the positions of the calibration pattern CP1a and the calibration pattern CP2a in the present embodiment) and the position calculation unit 111 calculates the depth position PP of the observation object using the parameters of temporal changes in the intensities of the signal light LS detected by the photodetector 6 (measurement signals SG in the present embodiment).

With this configuration, in the flow cytometer $1a$ according to the present embodiment, calibration patterns CPa, which are imaged at a plurality of detection positions disposed at different positions in the direction of the optical axis OX and in the longitudinal direction of the flow path $20a$, can be irradiated and the depth position PP can be calculated based on temporal changes in the intensities of signal light LS detected at the detection positions. Thereby, compared to the case where only one detection position is disposed, variations in the depth position PP are accurately determined and it is possible to accurately correct the effects of positional deviations of flow lines and/or effectively correct the position of the flow path when generating optical information indicating the structure of the observation object.

Third Embodiment

Hereinafter, a third embodiment of the present invention will be described in detail with reference to the drawings.

The second embodiment has been described above with respect to an example in which the flow path $20a$ is installed perpendicular to the direction of the optical axis OX, an observation object passing through the flow path is irradiated with calibration patterns CPa for detecting the depth position PP that are imaged at a plurality of measurement positions (the positions of the calibration pattern CP1$a$ and the calibration pattern CP2$a$ in the second embodiment) which differ in the direction of the optical axis OX and in the longitudinal direction of the flow path $20a$, and temporal changes in the intensities of signal light LS emitted from the observation object (measurement signals SG in the present embodiment) are detected to calculate the depth position PP. In the present embodiment, a flow path is installed inclined with respect to the direction of the optical axis OX. In the present embodiment, due to this structure, with calibration patterns irradiated to detect the depth position PP, a plurality of detection positions which allow to detect different depth positions PP can be established on the same focal plane where illumination light is imaged in the flow path.

A flow cytometer according to the present embodiment is referred to as a flow cytometer $1b$ and a flow path is referred to as a flow path $20b$. The calibration pattern according to the present embodiment is referred to as a calibration pattern CPb. An optical axis according to the present embodiment is referred to as an optical axis OXb and an arithmetic unit is referred to as an arithmetic unit $10b$.

The configuration of the flow cytometer $1b$ according to the present embodiment and the configuration of the flow cytometer 1 according to the first embodiment are similar, except that the flow path $20b$ is installed inclined with respect to the direction of the optical axis OXb. Since the flow path $20b$ is inclined with respect to the direction of the optical axis OXb, the depth direction of the flow path 20 is inclined with respect to the direction of the optical axis OXb. The configuration of the arithmetic device $10b$ according to the present embodiment is similar to the configuration of the arithmetic device $10a$ according to the second embodiment. A description of the same functions as in the first and second embodiments will be omitted and the description of the third embodiment will focus on parts that differ from the first and second embodiments.

Calibration Pattern

Figure 15:
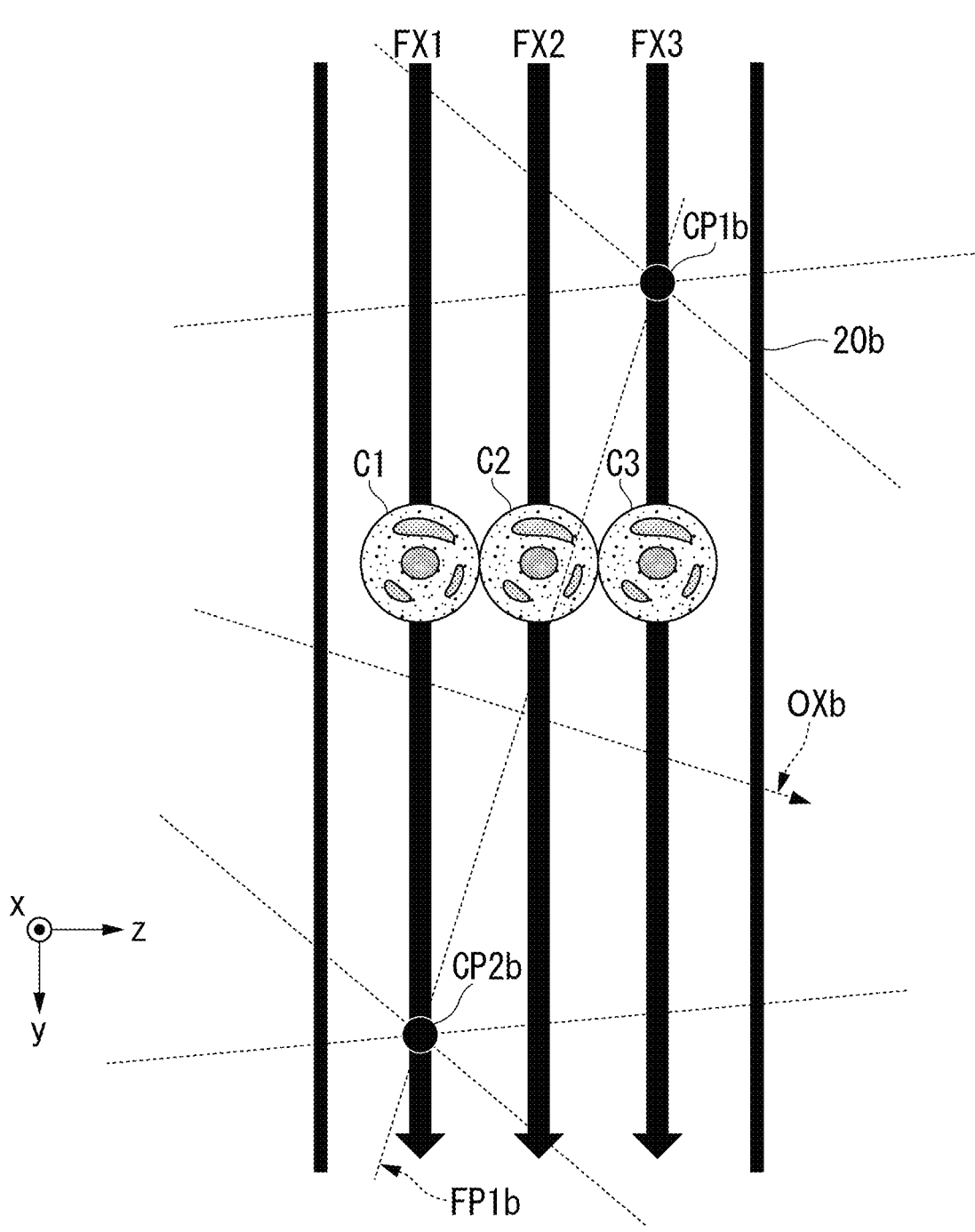
FIG. 15 is a diagram showing an example of a side view of calibration patterns according to a third embodiment of the present invention.

FIG. 15 is a diagram showing an example of a side view of calibration patterns CPb in the flow path $20b$ (a view of the flow path $20b$ seen from the x-axis direction) according to the present embodiment. Similarly, the position of an optical information generation pattern included in structured illumination pattern 21 is not shown in FIG. 15.

The longitudinal direction (the y-axis direction) of the flow path $20b$ is inclined with respect to the direction of the optical axis OXb. The calibration patterns CPb are irradiated into the flow path $20b$ obliquely with respect to the direction of the optical axis OXb and are imaged on a focal plane FP1$b$ in the flow path. In FIG. 15, cells C1, C2, and C3, which move along flow lines FX1, FX2, and FX3 that pass through different depth positions in the flow path, are illustrated as observation objects. Here, the depth positions PP of the flow lines FX1, FX2, and FX3 in the flow path $20b$ are the same as positions through which the cells C1, C2, and C3 pass along the flows of the flow lines FX1, FX2, and FX3 in FIG. 11. Detection positions for detecting the depth position PP in the depth direction (the z-axis direction) of the flow path $20b$ are established at the positions of the calibration patterns CP1$b$ and CP2$b$ on the same focal plane FP1$b$ and the positions are shown as circles in FIG. 15 for the sake of simplicity. In the present embodiment, the depth direction (the z-axis direction) of the flow path $20b$ is inclined with respect to the direction of the optical axis OXb unlike in the first embodiment.

As shown in FIG. 15, the calibration pattern CPb is imaged at the two positions of the calibration pattern CP1$b$ and the calibration pattern CP2$b$. The calibration pattern CPb, which is irradiated to the position of the calibration pattern CP1$b$ or the position of the calibration pattern CP2$b$ in FIG. 15, is irradiated as a pattern that is in a straight line parallel to the horizontal direction HX (the x-axis direction). The calibration pattern CP1$b$ and the calibration pattern CP2$b$ are disposed at different positions in the longitudinal direction of the flow path $20b$.

The calibration pattern CP1$b$ and the calibration pattern CP2$b$ are imaged on a common focal plane FP1$b$ in the direction of the optical axis OXb, while the flow path $20b$ is disposed inclined at a predetermined angle with respect to the focal plane FP1$b$ in the present embodiment. Therefore, the calibration pattern CP1$b$ and the calibration pattern CP2$b$ are disposed at different positions in the depth direction (the z-axis direction) of the flow path $20b$.

Here, the relative positional relationship of the imaging positions of the calibration patterns CP1$b$ and CP2$b$ shown in FIG. 15 with respect to the flow path $20b$ is the same as the relative positional relationship of the imaging positions of the calibration patterns CP1$a$ and CP2$a$ shown in FIG. 11 with respect to the flow path $20a$. As described above, the calibration pattern CP1$b$ and the calibration pattern CP2$b$ shown in FIG. 15 are disposed at different positions in the depth direction of the flow path $20b$, but are disposed on the common focal plane FP1$b$ of the illumination light that irradiates the flow path $20b$ in the direction of the optical axis OXb. On the other hand, the calibration pattern CP1$a$ and the calibration pattern CP2$a$ shown in FIG. 11 are located on different focal planes of the illumination light that irradiates the flow path $20b$ in the direction of the optical axis OX.

The arithmetic device $10b$ performs a position calculation process similar to the position calculation process of the arithmetic device $10a$ shown in FIG. 14. Note that the signal shapes of measurement signals SG at the detection positions of the calibration patterns CP1$b$ and CP2$b$ shown in FIG. 15 differ from those of measurement signals SG detected at the detection positions of the calibration patterns CP1$a$ and CP2$a$ shown in FIG. 12 even when a cell C passes through a position at the same depth position PP in the flow path. Therefore, the predetermined value for the peak value ratio R1 and the predetermined value for the width ratio R2 used in the position calculation process of the arithmetic device 10*b* differ from the values used in the position calculation process of the arithmetic device 10*a* shown in FIG. 14.

Summary of Third Embodiment

In the flow cytometer 1*b* according to the present embodiment, the flow path 20*b* is installed inclined with respect to the direction of the optical axis OXb of the illumination light as described above.

With this configuration, in the flow cytometer 1*b* according to the present embodiment, a plurality of detection positions for detecting the depth position can be established at the positions of different depth positions PP on one focal plane FP1 of the calibration patterns CPb irradiated into the flow path 20*b*. Therefore, a plurality of detection positions for detecting the depth position can be established with a simpler structure compared to when the light source 3 and the spatial light modulation unit 4 are disposed in a complicated arrangement such that a plurality of detection positions with different focal planes are established at a plurality of positions which are at different depth positions PP in the flow path 20*b* and at different positions in the longitudinal direction of the flow path 20*b*.

Fourth Embodiment

Hereinafter, a fourth embodiment of the present invention will be described in detail with reference to the drawings.

In the above first, second, and third embodiments, embodiments in which optical information from an observation object is generated using a structured illumination configuration have been described with respect to the case where an irradiation position in a flow path is irradiated with a calibration pattern combined with an optical information generation pattern for generating optical information and a detection position for detecting a depth position PP where a cell passes through the flow path is disposed at the position where the calibration pattern is imaged in the flow path. The present embodiment will be described with respect to an example in which a spatial light modulation unit is installed between a flow path and a photodetector and a depth position of a cell in the flow path is detected using an arrangement pattern of light transmissive regions of a mask included in the spatial light modulation unit provided between the flow path and the photodetector. A configuration in which the spatial light modulation unit is disposed in an optical path between the flow path and the photodetector as in the present embodiment will hereinafter also be referred to as a structured detection configuration.

In the structured detection configuration, optical information regarding the morphological information of an observation object can be acquired by signal light detected through light transmissive regions arranged in a mask included in the spatial light modulation unit. That is, in the present embodiment, signal light is subjected to structuring processing by a structured detection configuration and the information generation device acquires optical information using the signal light that is structured through the above-mentioned structuring processing. As shown in the present embodiment, the signal light subjected to the structuring processing by the spatial light modulation unit disposed in the optical path between the flow path and the photodetector is also referred to as structured signal light.

In the present embodiment, a position in the depth direction through which an observation object passes in the flow path is detected using an arrangement pattern of light transmissive regions of the mask included in the spatial light modulation unit provided between the flow path and the photodetector. Therefore, the present embodiment may also be referred to as an embodiment in which a calibration pattern is disposed by a mask in the following description. That is, in the present embodiment, a detection position for detecting a depth position where an observation object passes through the flow path is established by a spatial light modulation unit disposed by a structured detection configuration.

The flow cytometer according to the present embodiment is referred to as a flow cytometer 1*c* and the flow path is referred to as a flow path 20*c*. In the present embodiment, there is no need to install a structured illumination structure for acquiring optical information or a detection position for detecting the depth position PP in the illumination to irradiate the flow path in the flow cytometer. The basic configurations of the configuration of the flow cytometer 1*c* according to the present embodiment and the configuration of the flow cytometer 1 according to the first embodiment are similar, except that a structured illumination pattern 21 with which the flow path 20*c* is irradiated does not include an optical information generation pattern for acquiring optical information and a calibration pattern CP for detecting the depth position and that the mask 51*c* is disposed in the optical path between the flow path 20*c* and the photodetector 6. That is, while the flow cytometer 1 adopts a structured illumination configuration, the flow cytometer 1*c* adopts a structured detection configuration.

Also, in the flow cytometer of the present embodiment, the flow path position control device can control the position in the depth direction of the flow path 20*c* based on the detected depth position PP of the cell C.

Further, the flow cytometer of the present embodiment can have a mechanism of controlling the position of the mask based on the detected depth position PP as another method for correcting flow line deviations of cells C in the depth direction in the flow path 20*c*.

Figure 16:
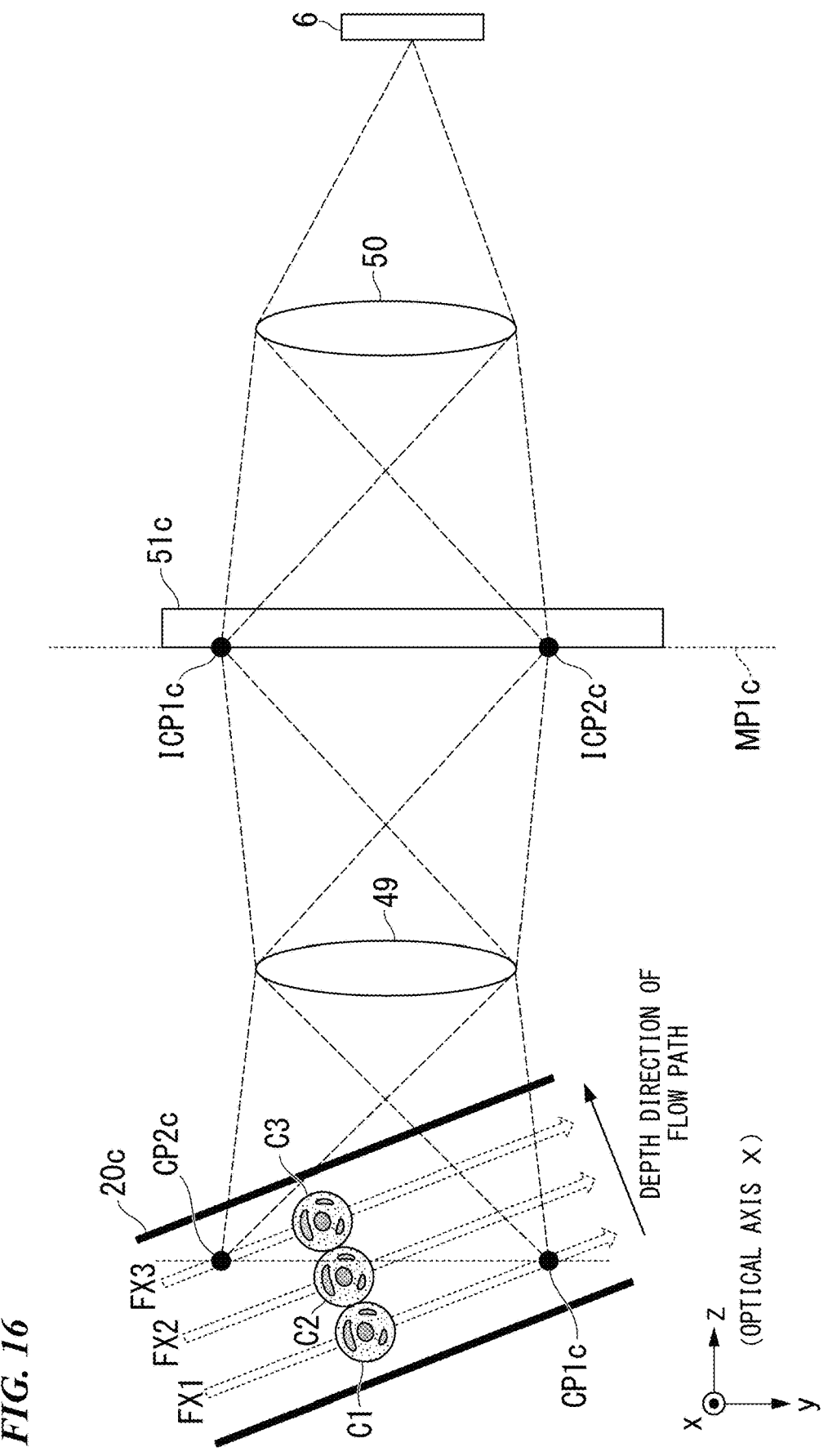
FIG. 16 is a diagram showing an example of a side view of the arrangement of a mask according to a fourth embodiment of the present invention.

FIG. 16 is a diagram showing an example of a side view of the arrangement of the mask 51*c* (a view of the flow path 20*c* seen from the x-axis direction) according to the present embodiment. In FIG. 16, light transmissive portions of the mask 51*c* through which signal light for generating optical information IC is transmitted are not shown for describing an embodiment in which a calibration pattern is disposed by a mask.

The mask 51*c* is provided between the flow path 20*c* and the photodetector 6. A lens 49 is provided between the mask 51*c* and the flow path 20*c* and an imaging lens 50 is provided between the mask 51*c* and the photodetector 6. The lens 49 and the mask 51*c* constitute a spatial light modulation unit 4*c* (not shown). In the example shown in FIG. 16, the imaging lens 50 constitutes a photodetection optical system 5, but the photodetection optical system 5 may further include a dichroic mirror or a wavelength selective filter.

Illumination light LE from a light source is irradiated onto a cell C passing through the irradiation position and signal light LS emitted from the cell C is detected by the photodetector 6 via the spatial light modulation unit 4*c* (not shown). At this time, the signal light LS is subjected to structuring processing by the spatial light modulation unit 4*c* (not shown). That is, the signal light LS is converted into structured signal light via the spatial light modulation unit 4*c*. Electrical signal pulses output by the photodetector 6 are further converted into electronic data and optical information IC indicating cell morphology information is generated.

On the other hand, in the present embodiment, the depth position PP of the cell C passing through the flow path 20*c* is detected using the arrangement pattern of the light transmissive regions of the mask 51*c* provided in the spatial light modulation unit 4*c* (not shown). A surface of the mask 51*c* on the lens 49 side has regions through which light is transmitted and the light transmissive regions of the mask 51*c* are arranged at positions that are optically conjugate, via the lens 49, to the detection positions in the flow path, which are established in the flow path 20*c* for detecting the depth position PP. With this configuration, the signal light LS emitted from the cell C passing through the flow path 20*c* is detected by the photodetector 6 as structured signal light via the spatial light modulation unit 4*c* (not shown). The structured signal light LS is further converted into electronic data and temporal changes in the intensities of the signal light are obtained as measurement signals SG. The cell C moving through the flow path 20*c* along the flow line FX forms a clearer image at the light transmissive regions of the mask 51*c* when passing near the detection positions and forms a more blurred image at the light transmissive regions of the mask 51*c* when moving along a flow line FX away from the detection positions. Therefore, the temporal changes in the intensities of the signal light LS detected by the photodetector 6 also change depending on the depth position PP of the cell passing through the flow path 20*c*.

In the present embodiment, by a mask pattern that is an arrangement pattern of the light transmissive regions arranged on the mask 51*c*, detection positions for detecting the depth position PP are set at positions in the flow path that are conjugate to the light transmissive regions. Because measurement signals SG based on signal light LS detected through the light transmissive regions of the mask 51*c* change in shape depending on the distances between the detection positions and the cell C passing through the flow path 20*c*, the depth position PP of the cell C passing through the flow path 20*c* can be calculated based on the measurement signals SG. In the present specification, the present embodiment is referred to as a mode in which a calibration pattern is disposed by a mask and a detection position disposed in the flow path by the mask pattern is expressed as the position of a calibration pattern. The surface of the mask 51*c* on the side where the light transmissive regions are arranged is expressed as a mask pattern surface MP1*c*. In FIG. 16, cells C that move along flow lines FX flowing through positions P1, P2, and P3, which are at different depth positions PP of the flow path 20*c*, are shown as cells C1, C2, and C3, respectively.

The mask 51*c* has regions through which light is transmitted and a region through which light is not transmitted on its mask pattern surface MP1*c*. In FIG. 16, the regions through which light is transmitted are arranged at a position ICPc that is optically conjugate, via the lens 49, to the position of a calibration pattern CP1*c*, which is one detection position on a flow line FX1 and a position ICP2*c* that is optically conjugate, via the lens 49, to the position of a calibration pattern CP2*c*, which is another detection position on a flow line FX3, on the mask pattern surface MP1*c* and the remaining part of the mask pattern surface MP1*c* is a region that does not transmit light, except for a light transmissive region (not shown) for acquiring optical information IC. That is, the mask pattern is designed such that regions through which light is transmitted are arranged in the plane of the mask pattern surface MP1 of the mask 51*c* at the position ICP1*c* which is a position optically conjugate to the position of the calibration pattern CP1*c* in the flow line FX1 and the position ICP2*c* which is a position optically conjugate to the position of the calibration pattern CP2*c* in the flow line FX3. Namely, in the mode in which a calibration pattern is disposed by a mask, the positions of the light transmissive regions of the mask 51*c* (the positions ICP1*c* and ICP2*c* in FIG. 16) are established in an optically conjugate positional relationship with detection positions predetermined on different flow lines in the flow path 20*c* (the positions CP1*c* and CP2*c* of the calibration patterns in FIG. 16), such that signal line LS emitted from a cell C when the cell C passes near a detection position is detected by the photodetector 6 via the photodetection optical system 5. Thereby, the depth position through which a cell passes can be detected using predetermined positions as detection positions, similar to the first to third embodiments in which depth position PP, through which a cell C passes, is calculated by irradiating detection positions disposed on different flow lines with illumination light for detecting the depth position PP.

Light transmitted through the light transmissive regions of the mask 51*c* is further collected to the photodetector 6 via the imaging lens 50 and the photodetector 6 detects the intensity of the signal light LS in time series. Here, the photodetector 6 detects the intensity of the signal light LS in time series via the light transmissive regions located at positions forming an imaging relationship with the positions of the calibration patterns CPc, which are a plurality of detection positions in the flow path 20*c*, among the regions of mask 51*c*. Here, the position where the photodetector 6 is disposed is preferably a position where the mask pattern of the mask 51*c* is imaged by the imaging lens 50, although it may be any position where a sufficient amount of light that has passed through the mask 51*c* (for example, light transmitted through the transmissive regions) is collected.

Figure 17:
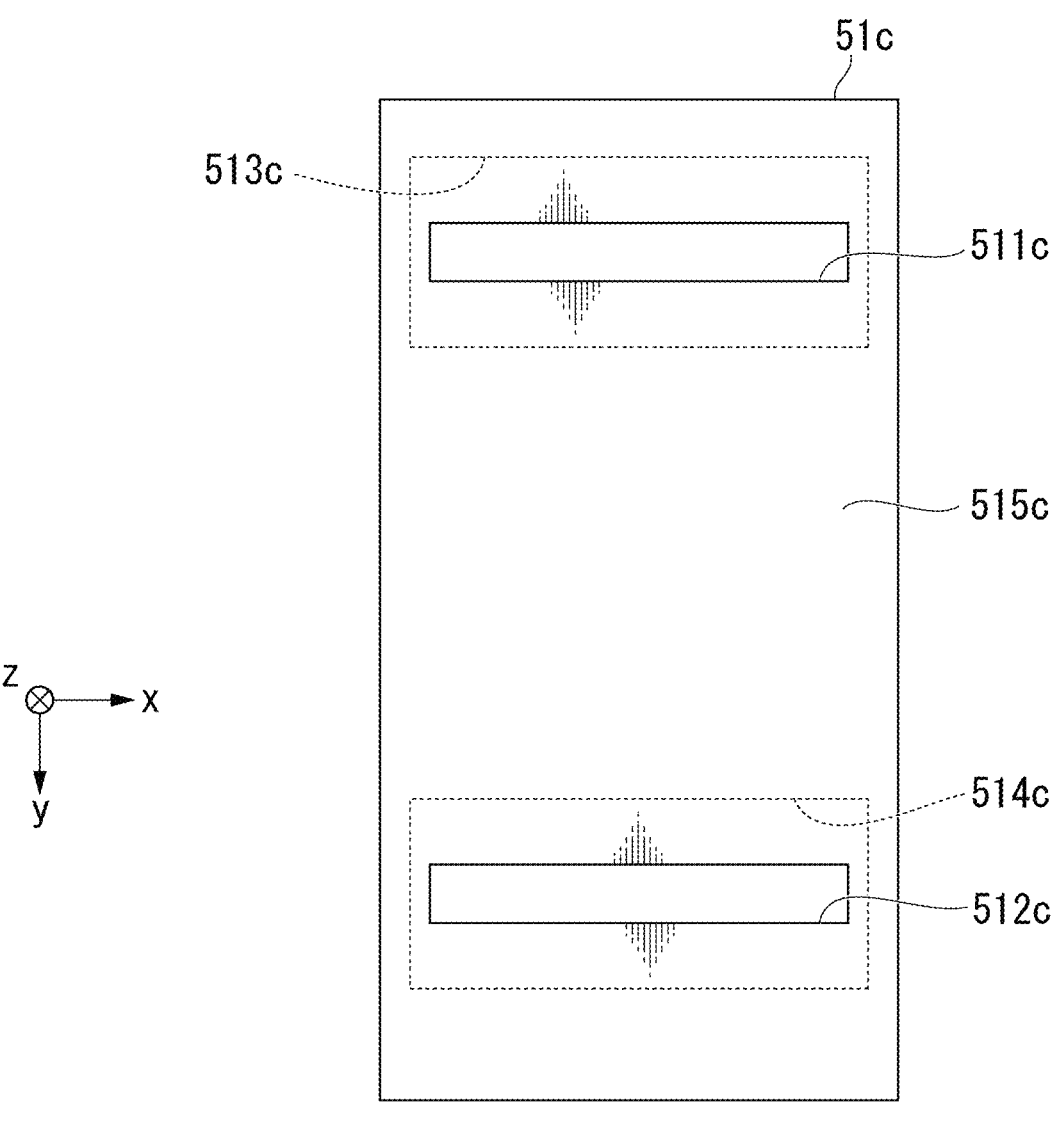
FIG. 17 is a diagram showing an example of a front view of the mask according to the fourth embodiment of the present invention.
Figure 18:
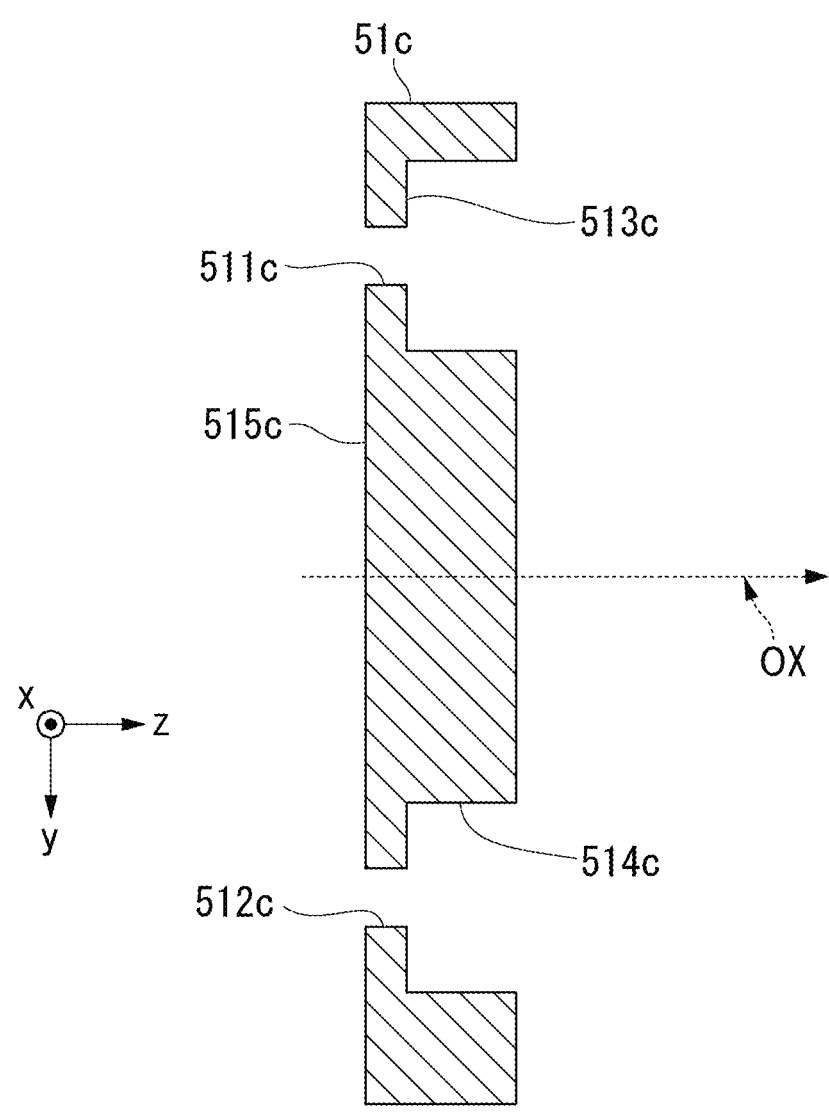
FIG. 18 is a diagram showing an example of a side view of the mask according to the fourth embodiment of the present invention.

Here, the mask 51*c* will be described with reference to FIGS. 17 and 18. FIG. 17 is a diagram showing an example of a front view of the mask 51*c* according to the present embodiment. The front view is a view seen from the flow path 20*c* side (the z-axis direction). FIG. 18 is a diagram showing an example of a side view of the mask 51*c* according to the present embodiment. The side view is a view seen from the side (the x-axis direction) along the optical axis OX. As shown in FIG. 17, the mask 51*c* has an opening 511*c* and an opening 512*c* on a front surface 515*c*, which is a surface on the lens 49 side, as regions through which light is transmitted. In the mask 51*c*, the front surface 515*c* forms a mask pattern surface MP1*c*. The position of light transmissive portions of the mask 51*c* through which signal light for generating optical information IC is transmitted is not shown in FIGS. 17 and 18 as well for describing the embodiment in which a calibration pattern is disposed by a mask. Thus, light transmissive portions through which signal light for generating optical information IC is transmitted are present in the actual configuration, although the mask 51*c* of the FIGS. 16 to 18 is described as having a configuration in which light is not transmitted through regions other than the openings 511*c* and 512*c* of the mask pattern surface MP1*c*.

As shown in FIG. 18, the mask 51*c* has a groove 513*c* and a groove 514*c* on the back side of the front surface 515*c*. The groove 513*c* and the groove 514*c* are provided on the surface opposite to the front surface 515*c* of the openings 511*c* and 512*c*. In the mask 51*c*, both the openings and the grooves are regions through which signal light is transmitted, but each opening is designed to have a smaller area through which light is transmitted than a groove.

Returning to FIG. 16, the description of the arrangement of the mask 51*c* will be continued.

The flow path 20c is disposed inclined at a predetermined angle with respect to the surface of the mask 51c. When cells C passing through the flow path 20c moves along different flow lines FX in the depth direction of the flow path 20c (illustrated as flow lines FX1, FX2, and FX3 in FIG. 16), the measurement signals SG, which are temporal changes in the intensities of the signal light LS detected by the photodetector 6, change in shape depending on the distances between the positions of the calibration patterns CPc in the flow path 20c, which are the detection positions, and the cells C passing through the flow path 20c as described above.

Here, when the photodetector 6 measures signal light LS transmitted through the position ICP1c, which is a position on the mask 51c optically conjugate to the position of the calibration pattern CP1c in the flow line FX1, the peak value of the measurement signal SG, which is detected by the photodetector 6 via the mask 51c, decreases and the width thereof increases as the depth position PP of the cell C passing through the flow path 20c moves away from the flow line FX 1, compared to the case where the depth position PP of the cell C matches the flow line FX1, similar to the first embodiment.

Similarly, when the photodetector 6 measures light transmitted through the position ICP2c, which is a position on the mask 51c optically conjugate to the position of the calibration pattern CP2c which is the detection position in the flow line FX3, the peak value of the measurement signal SG, which is detected by the photodetector 6 via the mask 51c, increases and the width thereof decreases as the depth position PP, which is a passage position in the depth direction of the cell C through which the cell C passes in the flow path 20c, moves toward the flow line FX3.

The arithmetic device 10c performs a position calculation process similar to the position calculation process of the arithmetic device 10a shown in FIG. 13.

Summary of Fourth Embodiment

The flow cytometer 1c according to the present embodiment further includes a mask 51c between the flow path 20c and the photodetector 6 as described above. A plurality of light transmissive regions arranged in the mask 51c are arranged at positions that are optically conjugate to the detection positions for detecting the depth position PP in the flow path 20c via the lens 49 and the photodetector 6 detects the intensities of signal light LS emitted from a cell C passing near the detection positions in time series through the regions of the mask 51c through which light is transmitted. With this configuration, the flow cytometer 1c according to the present embodiment can detect a depth position PP in the flow path through which a cell C passes using the plurality of predetermined positions described above as detection positions due to the structure of the mask 51c provided between the flow path 20c and the photodetector 6. In the example of the flow cytometer 1c shown in the above embodiment, the positions of calibration patterns, which are detection positions for detecting a depth position PP through which a cell C passes in the flow path 20c, are set by the arrangement pattern of openings on the mask pattern surface MP1c of the mask 51c.

In the flow cytometer 1c according to the present embodiment, the depth position PP can be detected by installing the mask 51c between the flow path 20c and the photodetector 6. Therefore, there is no need to establish an optical information generation pattern for generating optical information IC and a calibration pattern for detecting the depth position PP by the structured illumination configuration and it is possible to increase the degree of freedom in designing the illumination optical system and reduce the size of the device.

Fifth Embodiment

Hereinafter, a fifth embodiment of the present invention will be described in detail with reference to the drawings.

The fourth embodiment has been described with respect to an example in which calibration patterns are disposed by a mask. In the fourth embodiment, a plurality of openings, which are light transmissive regions of the mask, are installed on the mask pattern surface on one side of the mask and the flow path is provided such that the direction of flow lines along which cells move through the flow path is inclined with respect to the mask pattern surface of the mask. The present embodiment will be described with respect to an example in which a flow path is installed such that flow lines in the flow path are parallel to the direction of a mask pattern surface of the mask and a plurality of openings of the mask are provided at different positions in the direction of the optical axis of a photodetection optical system.

A flow cytometer according to the present embodiment is referred to as a flow cytometer 1d and the flow path is referred to as a flow path 20d. The mask according to the present embodiment is referred to as a mask 51d.

The configuration of the flow cytometer 1d according to the present embodiment and the configuration of the flow cytometer 1c according to the fourth embodiment are similar, except that the positions of the plurality of openings of the mask 51d differ in the direction of the optical axis of the photodetection optical system and that the flow path 20d is provided approximately parallel to the direction of a mask pattern surface MPd of the mask 51d. A description of the same functions as in the fourth embodiment will be omitted and the description of the fifth embodiment will focus on parts that differ from the fourth embodiment.

Figure 19:
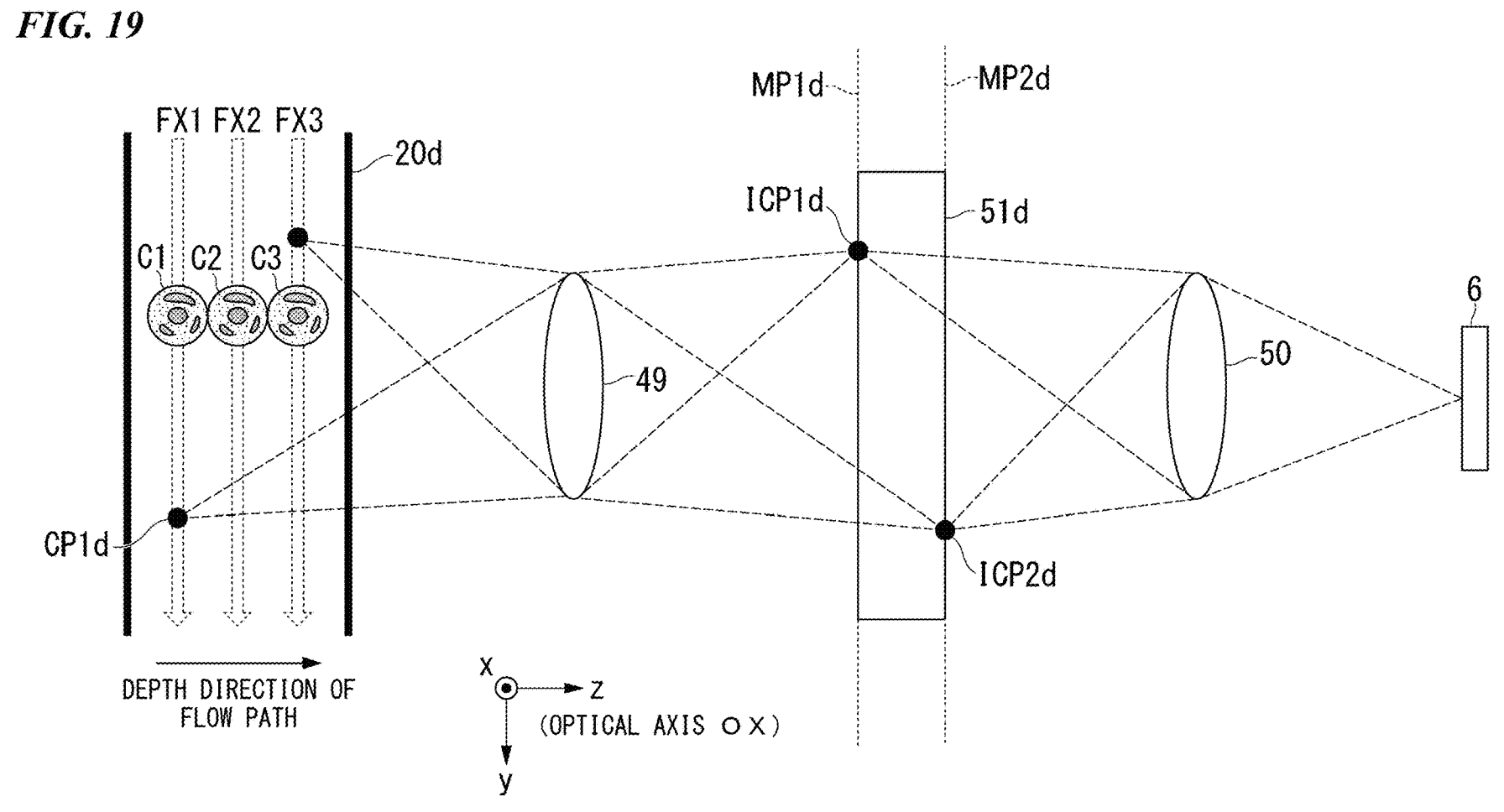

FIG. 19 is a diagram showing an example of a side view of the arrangement of the mask 51c (a view of the flow path 20c seen from the x-axis direction) according to the present embodiment. In FIG. 19 as well, light transmissive portions of the mask 51d through which signal light for generating optical information IC of the mask 51d is transmitted are not shown for describing an embodiment in which a calibration pattern is disposed by a mask.

In the present embodiment, a lens 49, the mask 51d, and an imaging lens 50 are arranged in this order in an optical path between the flow path 20d and a photodetector 6. In the example of FIG. 19, the lens 49 and the mask 51d constitute a spatial light modulation unit 4d and the imaging lens 50 constitutes a photodetection optical system 5. In the present embodiment, the depth direction of the flow path and the direction of the optical axis OX of the photodetection optical system (the z-axis direction) match.

Figure 20:
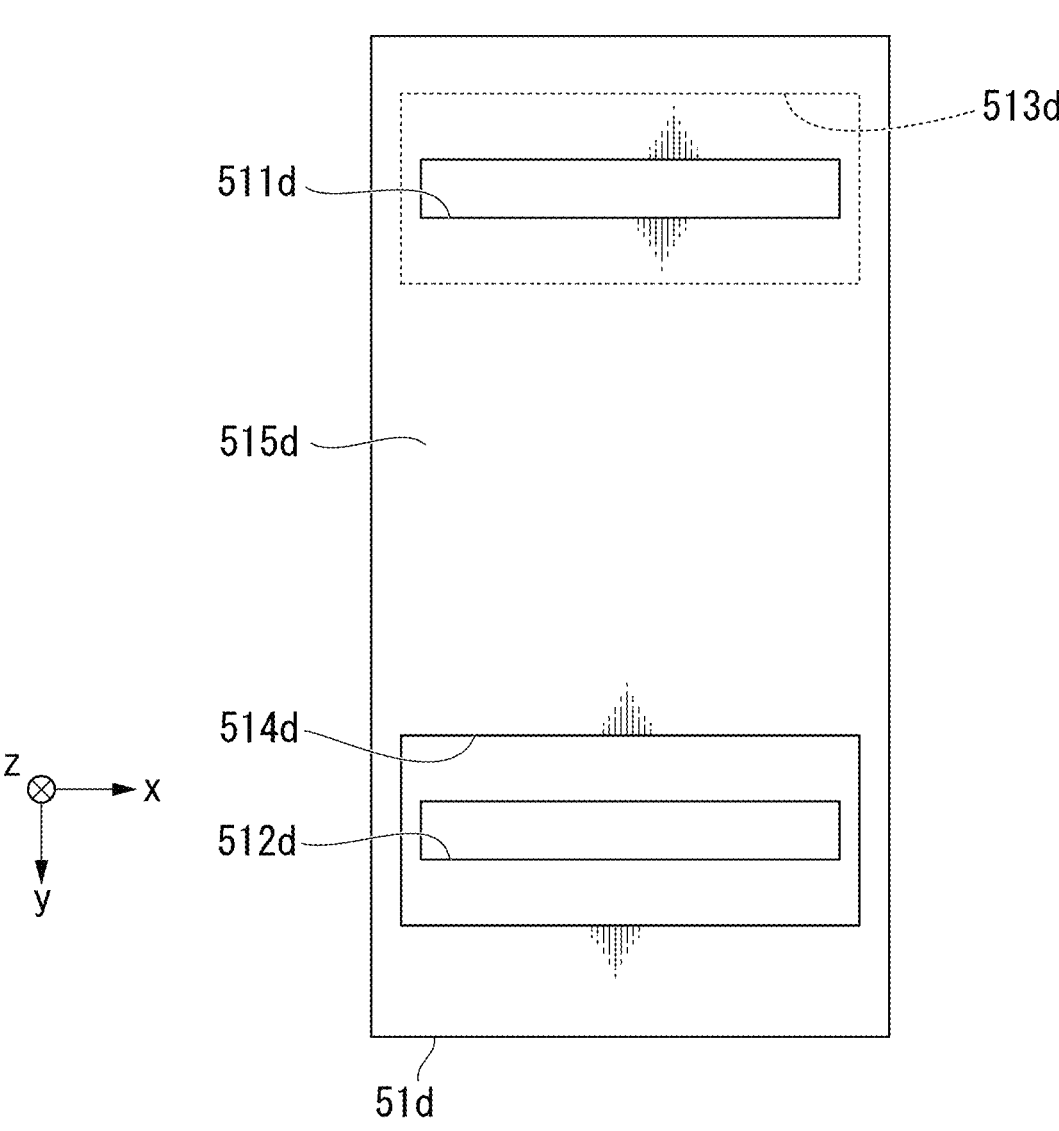
FIG. 20 is a diagram showing an example of a front view of the mask according to the fifth embodiment of the present invention.
Figure 21:
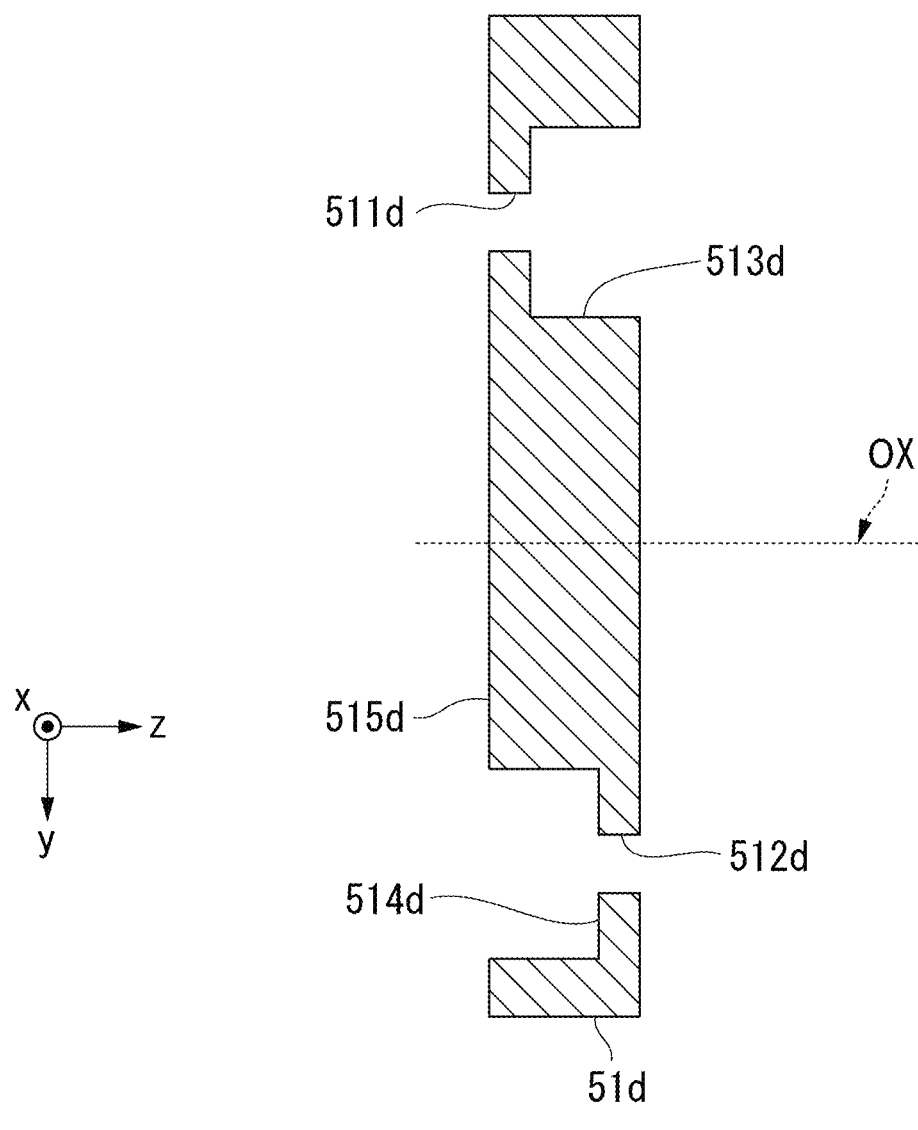
FIG. 21 is a diagram showing an example of a side view of the mask according to the fifth embodiment of the present invention.

Here, the mask 51d will be described with reference to FIGS. 20 and 21. FIG. is a diagram showing an example of a front view of the mask 51d according to the present embodiment. The front view is a view of the mask 51d seen from the flow path 20d side (the z-axis direction). FIG. 21 is an example of a side view of the mask 51d according to the present embodiment. The side view is a view of the mask 51d seen from the side (the x-axis direction) along the optical axis OX. Similar to FIG. 17, the mask 51d has an opening 511d on a front surface 515d as a region through which light is transmitted. On the other hand, the mask 51d also has an opening 512d on a surface behind the front surface 515*d* as a region through which light is transmitted. The position of light transmissive portions through which signal light for generating optical information IC of the mask 51*d* is transmitted is similarly not shown in FIGS. 20 and 21 as these are for describing the embodiment in which a calibration pattern is disposed by a mask. Thus, light transmissive portions through which signal light for generating optical information IC is transmitted are present in the actual configuration, although the mask 51*d* of FIGS. 19 to 21 is described as having a configuration in which light is not transmitted through regions other than the openings 511*d* and 512*d*.

As shown in FIG. 21, the mask 51*d* has a groove 513*d* on the back side of the front surface 515*d*. The opening 511*d* is provided at a position corresponding to the groove 513*d* on the front surface 515*d*. On the other hand, the mask 51*d* has a groove 514*d* on the front surface 515*d*. The opening 512*d* is provided at a position corresponding to the groove 514*d* on the back side of the front surface 515*d*. In the mask 51*d*, the front surface 515*d* corresponds to a mask pattern surface MP1*d* and the surface behind the front surface 515*d* corresponds to a mask pattern surface MP2*d*. That is, in the mask 51*c*, both the front surface 515*d* and the surface behind the front surface 515*d* form mask pattern surfaces MPd. In the mask 51*d*, both the openings and the grooves are regions through which signal light is transmitted, but each opening is designed to have a smaller area through which light is transmitted than a groove on either mask pattern surface.

The opening 511*d* and the opening 512*d* are provided at different depth positions in the thickness direction of the mask 51*d*. Here, the thickness direction of the mask 51*d* is the direction of the optical axis OX and the mask 51*d* is provided with a plurality of light transmissive regions at different positions in the direction of the optical axis OX. In the present embodiment, the mask 51*d* has a plurality of openings, which are provided at different positions in the depth direction of the flow path, as regions through which light is transmitted, because the depth direction of the flow path and the direction of the optical axis OX (the z-axis direction) match.

Returning to FIG. 19, the description of the arrangement of the mask 51*d* will be continued.

In the flow cytometer 1*d* according to the present embodiment, the mask pattern surfaces MPd on the mask 51*d* are provided in a direction perpendicular to the direction of the optical axis OX along which signal light LS emitted from cells C travels. The lens 49 is provided between the mask 51*d* and the flow path 20*d* and the imaging lens 50 is provided between the mask 51*d* and the photodetector 6. In the example shown in FIG. 19, the lens 49 and the mask 51*d* constitute the spatial light modulation unit 4*d* (not shown) and the imaging lens 50 constitutes the photodetection optical system 5 (not shown), but the photodetection optical system 5 (not shown) may further include a dichroic mirror or a wavelength selective filter.

The flow path 20*d* is irradiated with illumination light LE (not shown) from a light source (not shown). Signal light LS emitted from a cell passing through a position irradiated with the illumination light LE is focused on the photodetector 6 via the spatial light modulation unit 4*d* and the photodetection optical system 5. The mask 51*d* included in the spatial light modulation unit 4*d* has openings at positions optically conjugate to the positions of calibration patterns CPd, which are positions for detecting the depth position PP of the cell passing through the flow path 20*d*. With this configuration, the signal light LS emitted from the cell C is detected by the photodetector 6 through the openings which are light transmissive regions of the mask 51*d*. As described above, the mask 51*d* has an opening 511*d* and an opening 512*d*, which are provided at different positions in the depth direction of the flow path, as regions through which light is transmitted. As shown in FIG. 19, the mask 51*d* has the opening 511*d* on the mask pattern surface MP1*d* at a position ICP1*d* that is optically conjugate to the position of a calibration pattern CP1*d* in a flow line FX1 and the opening 512*d* on the mask pattern surface MP2*d* at a position ICP2*d* that is optically conjugate to the position of a calibration pattern CP2*d* in a flow line FX3. That is, in the present embodiment, the positions of the light transmissive regions of the mask 51*d* (the positions ICP1*d* and ICP2*d* corresponding to the openings of the mask 51*d* in FIG. 19) are established at positions forming an imaging relationship with the detection positions (the positions of calibration patterns CP1*d* and CP2*d* in FIG. 19) established at predetermined positions which are at different depth positions PP in the flow path 20*d* in the flow cytometer 1*d*. Therefore, a depth position PP of a cell passing through the predetermined positions as detection positions can be detected by detecting signal light LS transmitted through the light transmissive regions of the mask 51*d* with the photodetector 6, similar to the case where the depth position PP of the cell C is calculated by irradiating calibration patterns onto detection positions established at different depth positions PP. In that case, when a measurement signal SG is measured through the opening 511*d* provided at the position ICP1*d* corresponding to the position of the calibration pattern CP1*d* in the flow line FX1, the peak value of the measurement signal SG measured by the photodetector 6 decreases and the width thereof increases as the depth position PP of the cell C passing through the flow path 20*d* moves away from the position of the flow line FX 1, compared to the case where the depth position PP of the cell C matches the position of the flow line FX1, similar to the above embodiments. Also, when a measurement signal SG is measured through the opening 512*d* provided at the position ICP2*d* corresponding to the position of the calibration pattern CP2*d* in the flow line FX3, the peak value of the measurement signal SG measured by the photodetector 6 decreases and the width thereof increases as the depth position PP of the cell C moves away from the position of the flow line FX 3, compared to the case where the depth position PP of the cell C matches the position of the flow line FX3. Thus, in the flow cytometer 1*d*, openings are provided on different mask pattern surfaces MPd of the mask 51*d* and the photodetector 6 detects signal light LS, which is emitted from a cell C flowing through the flow path, via the openings provided at different positions in the direction of the optical axis OX. Thereby, the depth position PP of the cell C in the flow path 20*d* is detected.

Summary of Fifth Embodiment

In the flow cytometer 1*d* according to the present embodiment, the mask 51*d* has a plurality of openings (the openings 511*d* and an opening 512*d* in the present embodiment) that are provided at different positions in the direction of the optical axis OX as light transmissive regions as described above.

With this configuration, in the flow cytometer 1*d* according to the present embodiment, a plurality of detection positions for detecting a depth position PP through which a cell C passes in the flow path 20*d* (the position of the calibration pattern CP1*d* in the flow line FX1 and the position of the calibration pattern CP2*d* in the flow line FX3 in FIG. 19) can be established at different positions in the direction of the optical axis OX without tilting the flow path 20*d* with respect to the mask pattern surfaces MPd of the mask 51*d*. With this configuration, it is possible to detect the depth position PP through which the cell C passes in the flow path 20*d*.

Sixth Embodiment

Hereinafter, a sixth embodiment of the present invention will be described in detail with reference to the drawings.

The present embodiment will be described with respect to the case where a cell flowing through a flow path is discriminated based on optical information generated by an information generation device.

A flow cytometer according to the present embodiment is referred to as a flow cytometer 1*e* and an arithmetic device is referred to as an arithmetic device 10*e*. The configuration of the flow cytometer 1*e* is similar, for example, to the configuration of the flow cytometer 1 according to the first embodiment, except that their arithmetic devices differ. A description of the same functions as in the first embodiment will be omitted and the description of the sixth embodiment will focus on parts that differ from the first embodiment. The components other than the arithmetic device 10*e* of the flow cytometer 1*e* may be similar to those of the flow cytometers according to the second, third, fourth, and fifth embodiments other than the first embodiment described above.

Arithmetic Device

FIG. 22 is a diagram showing an example of a configuration of the arithmetic device 10*e* according to the present embodiment. When compared to the arithmetic device 10 (FIG. 8) according to the first embodiment, the arithmetic device 10*e* (FIG. 22) according to the present embodiment differs in terms of an optical information acquiring unit 114*e*, a position determining unit 115*e*, a discriminating unit 116*e*, a learning unit 117*e*, and a storage unit 118*e*. Here, the functions of the other components (a signal intensity acquiring unit 110, a position calculation unit 111, an output unit 112, and a scan unit 113) are similar to those of the first embodiment.

A control unit 11*e* includes the optical information acquiring unit 114*e*, the position determining unit 115*e*, the discriminating unit 116*e*, the learning unit 117*e*, and the storage unit 118*e* in addition to the signal intensity acquiring unit 110, the position calculation unit 111, the output unit 112, and the scan unit 113.

The optical information acquiring unit 114*e* acquires optical information IC generated by a PC 8.

The position determining unit 115*e* determines whether or not the depth position PP of a cell C, which is indicated by position information IP output by the output unit 112, is within a predetermined range in the flow path in the direction of the optical axis OX. The direction of the optical axis OX is the depth direction of the flow path.

The discriminating unit 116*e* discriminates the cell C based on the optical information IC generated by the PC 8 based on machine learning. The discriminating unit 116*e* designates cells C flowing within a region Z1, which is a predetermined range, as objects to be discriminated based on the determination result of the position determining unit 115*e*.

Figure 23:
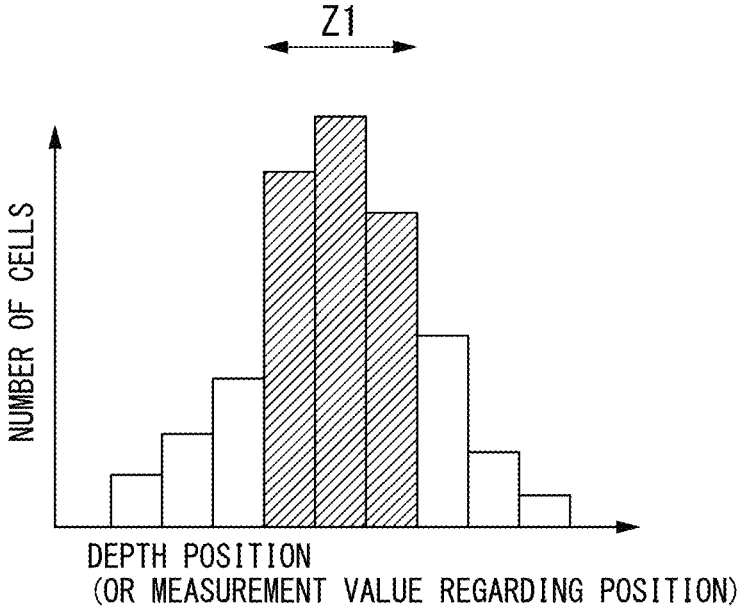
FIG. 23 is a diagram showing an example of a region according to the sixth embodiment of the present invention.

Here, the region Z1 will be described with reference to FIG. 23. FIG. 23 is a diagram showing an example of the region Z1 according to the present embodiment. FIG. 23 is a histogram showing, for each predetermined interval, the number of cells C whose depth position measurement values are included in the predetermined interval when a depth position PP where a cell C passes through the flow path 20 is measured for each cell C flowing through the flow path 20 and the range of possible values for the depth position in the flow path 20 is segmented into the predetermined intervals. The discriminating unit 116*e* designates the optical information IC of cells C corresponding to measurement values passing through the range of intervals included in the region Z1, among cells C passing through the flow path 20, as objects to be discriminated.

The region Z1 is, for example, a line segment ranging up to intervals including positions which deviate by a predetermined distance from an initial passage position of a cell C in the depth position PP of the cell C passing through the flow path 20 as shown in FIG. 23.

The position determining unit 115*e* may determine whether or not a cell C flowing through the flow path 20 is included in a region corresponding to the region Z1 based on a measurement value of an amount regarding the depth position PP instead of the measurement value of the depth position PP. The region corresponding to the region Z1 is a region corresponding to the region Z1 in the line segment in which the measurement value regarding the depth position PP is indicated.

Returning to FIG. 22, the description of the configuration of the arithmetic device 10*e* will be continued.

The learning unit 117*e* performs machine learning. The learning unit 117*e* learns the relationship between cells for training and optical information IC for the cells for training. The machine learning performed by the learning unit 117*e* is, for example, deep learning.

In the present embodiment, cells C are measured using the flow cytometer 1*e* and machine learning is performed using measurement values of the cells C that flow within the region Z1 of the flow path 20 when measured. Hereinafter, in the present specification, cells C for training that flowed within the region Z1 of the flow path 20 when the cells C for training are measured using the flow cytometer 1*e* may also be referred to as training cells.

Figure 24:
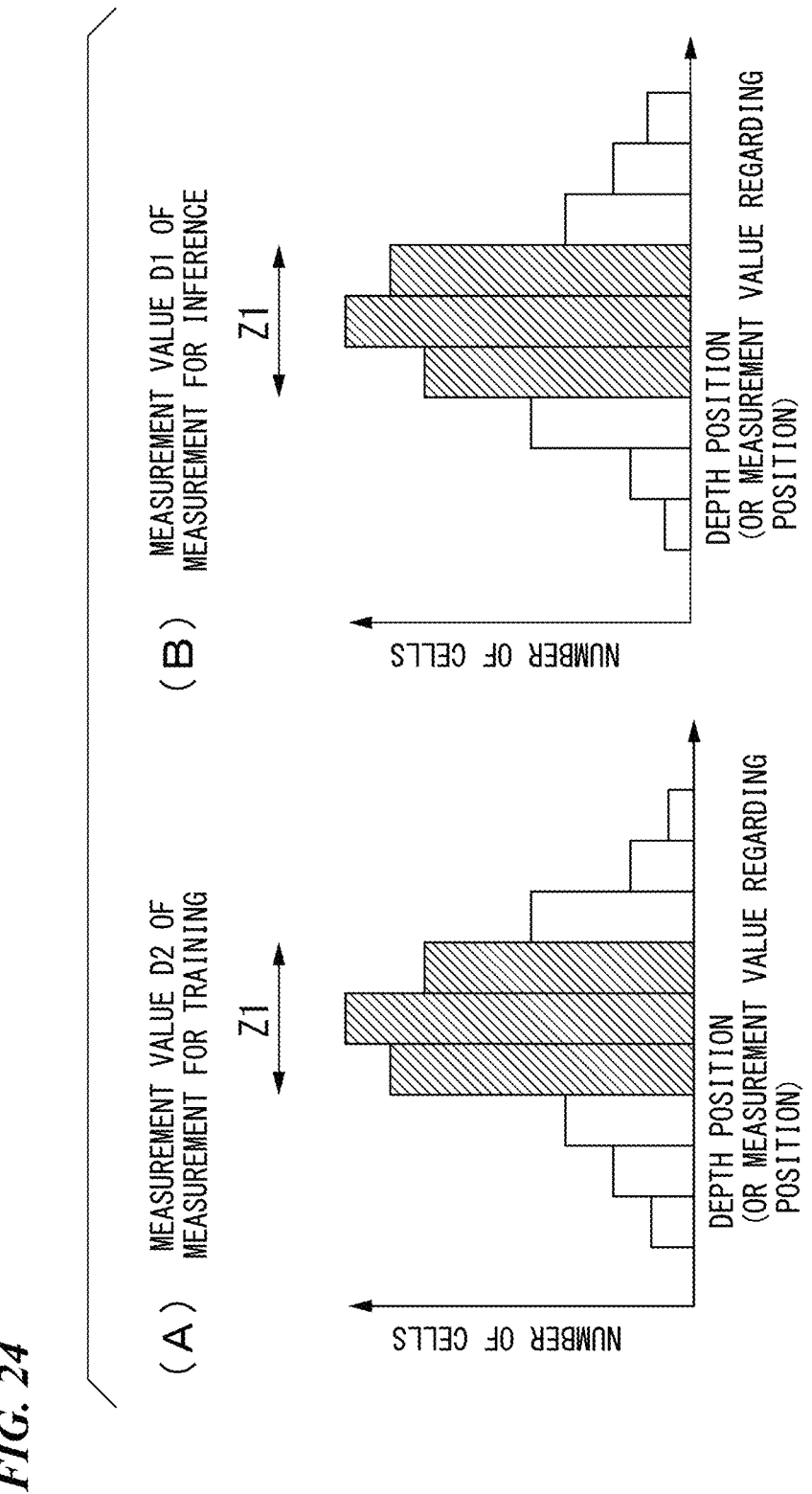
FIG. 24 is a diagram showing an example of a region for training cells according to the sixth embodiment of the present invention.

Here, the region Z1 for training cells will be further described with reference to FIG. 24. FIG. 24 is a diagram showing an example of the region Z1 for training cells according to the present embodiment. FIG. 24(A) is a histogram showing, for each predetermined interval, the number of cells C whose depth position measurement values are included in the predetermined interval. In that case, a depth position PP through which a cell C passes in the flow path 20 is measured when performing a measurement for training using the flow cytometer 1*e* in order to perform machine learning on cells C, and the range of possible values for the depth position in the flow path is divided into the predetermined intervals. For comparison, FIG. 24(B) shows a histogram showing, for each predetermined interval, the number of cells C whose depth position measurement values are included in the predetermined interval. In that case, a depth position through which a cell C passed is measured during machine learning inference and the range of possible values for the depth position is divided into the predetermined intervals.

In the present embodiment, information regarding cells C for training used by the learning unit 117*e* during learning is optical information IC acquired from cells C flowing within the region Z1. This region Z1 is the same as a region Z1 in which cells C, which the discriminating unit 116*e* designates as objects to be discriminated during inference, flow. That is, the training cells are cells C that flow in the same region Z1 as a region Z1 in which cells C, which the discriminating unit 116*e* designates as objects to be discriminated, flow.

Returning to FIG. 22, the description of the configuration of the arithmetic device 10*e* will be continued.

The storage unit 118*e* stores various information. The information stored in the storage unit 118*e* includes a learning result LDe. The learning result LDe is a result of learning performed by the learning unit 117*e*. Learning is performed in advance to store the learning result LDe in the storage unit 118*e*.

Cell Discrimination Process

Figure 25:
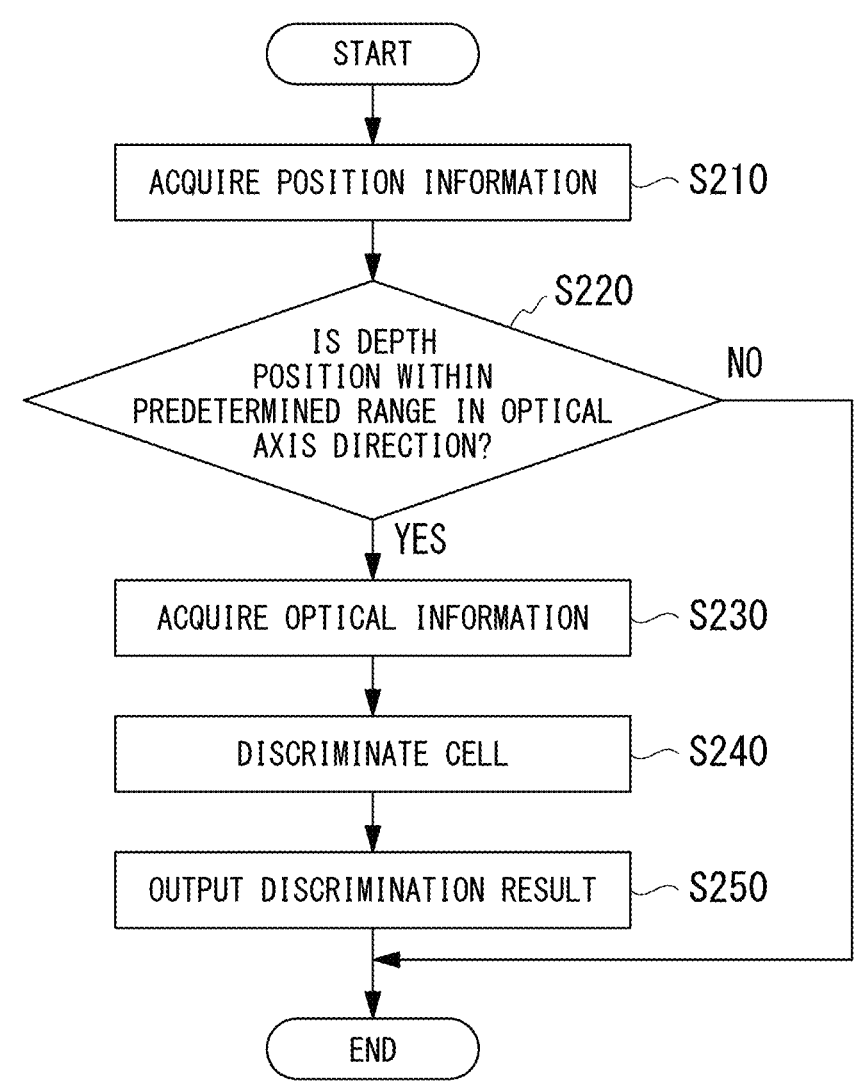
FIG. 25 is a diagram showing an example of a cell discrimination process according to the sixth embodiment of the present invention.

Next, a cell discrimination process in which the arithmetic device 10*e* discriminates cells C will be described with reference to FIG. 25. FIG. 25 is a diagram showing an example of a cell discrimination process according to the present embodiment. The cell discrimination process shown in FIG. 25 is performed for one cell C. In a cell discrimination process performed for a plurality of cells flowing through the flow path 20, the cell discrimination process shown in FIG. 25 is repeated for each of the plurality of cells.

Step S210: The position determining unit 115*e* acquires position information IP output by the output unit 112.

Step S220: The position determining unit 115*e* determines whether or not a depth position PP of a cell C indicated by the position information IP output by the output unit 112 is within a region Z1 which is a predetermined range in the depth direction of the flow path 20.

When the position determining unit 115*e* has determined that the depth position PP of the cell C is within the region Z1 in the depth direction of the flow path 20 (YES in step S220), the control unit 11*e* performs the processing of step S230. On the other hand, when the position determining unit 115*e* has determined that the depth position PP of the cell C passing through the flow path 20 is not within the region Z1 in the depth direction of the flow path 20 (NO in step S220), the control unit 11*e* ends the cell discrimination process.

Step S230: The optical information acquiring unit 114*e* acquires optical information IC generated by the PC 8. The optical information acquiring unit 114*e* provides the acquired optical information IC to the discriminating unit 116*e*.

Step S240: The discriminating unit 116*e* discriminates the cell C based on a learning result LDe and the optical information IC generated by the PC 8. The learning result LDe is a result of learning the relationship between a training cell and optical information regarding the training cell as described above. For example, when deep learning is used as machine learning, the learning result LDe indicates a neural network trained to output the type of a cell when optical information has been input.

The discriminating unit 116*e* inputs the optical information IC generated by the PC 8 to the neural network indicated by the learning result LDe. The discriminating unit 116*e* determines whether or not the type of the cell output by the neural network indicated by the learning result LDe is a desired cell type.

The processing of step S240 is performed when the position determining unit 115*e* has determined in the processing of step S220 that the depth position PP of the cell C passing through the flow path 20 is within the region Z1 in the direction of the optical axis OX. That is, the discriminating unit 116*e* designates a cell C flowing within the region Z1, which is a predetermined range, as an object to be discriminated based on the determination result of the position determining unit 115*e*.

Step S250: The discriminating unit 116*e* outputs the discrimination result to an external device via the output unit 112. Here, the external device is, for example, a sorting unit that sorts the cell C. When the flow cytometer 1*e* includes a sorting unit, the flow cytometer 1*e* functions as a cell sorter.

Then, the arithmetic device 10 ends the cell discrimination process.

Although the present embodiment has been described with respect to an example in which the learning unit 117*e* is provided in the arithmetic device 10*e* and the arithmetic device 10 performs machine learning, the present invention is not limited to this. Machine learning may be performed by an external device. When machine learning is performed by an external device, the arithmetic device 10*e* acquires a learning result of machine learning performed by the external device from the external device, stores the learning result in the storage unit 118*e*, and uses the stored learning result for a cell discrimination process.

Summary of Sixth Embodiment

As described above, in the flow cytometer 1*e* according to the present embodiment, the arithmetic device (the PC8 in the present embodiment) includes a discriminating unit 116*e* and a position determining unit 115*e*.

The discriminating unit 116*e* discriminates an observation object (a cell C in the present embodiment) based on optical information IC generated by an information generation device (the PC8 in the present embodiment).

The position determining unit 115*e* determines whether or not the depth position PP of a cell C passing through the flow path 20 indicated by the position information IP output by the output unit 112 is within a predetermined range (the region Z1 in the present embodiment) in the direction of the optical axis OX.

Based on the determination result of the position determining unit 115*e*, the discriminating unit 116*e* designates an observation object (a cell C in the present embodiment) flowing within the predetermined range (the region Z1 in the present embodiment) as an object to be discriminated.

With this configuration, the flow cytometer 1*e* according to the present embodiment can reduce variations in the analysis results (the optical information IC) for discriminating observation objects depending on positional deviations in the depth direction of flow lines because only observation objects flowing within the predetermined range in the flow path 20 can be designated as objects to be discriminated. The flow cytometer 1*e* according to the present embodiment can also achieve stable data analysis with less variations than when gating based on the position information IP is not performed, because aligned data can be obtained by performing gating based on position information IP indicating the depth position PP.

In the flow cytometer 1*e* according to the present embodiment, the discriminating unit 116*e* discriminates an observation object (a cell C in the present embodiment) based on both an inference model that is based on a learning result LDe of learning the relationship between an observation object for training (a training cell in the present embodiment) and optical information IC regarding the observation object for training and optical information IC generated by the information generation device (the PC 8 in the present embodiment).

Observation objects for training (training cells in the present embodiment) are observation objects (cells in the present embodiment) that flow within a predetermined range (the region Z1 in the present embodiment).

With this configuration, the flow cytometer 1e according to the present embodiment can perform the discrimination process based on the inference model that is based on the learning result LDe of learning the relationship between an observation object flowing within the predetermined range and optical information IC regarding the observation object for training. Therefore, the influence of positional deviations of flow lines in the optical axis direction on the learning result LDe can be reduced compared to the case where observation objects for training are not limited to observation objects flowing within the predetermined range, such that the accuracy of machine learning based on the learning result LDe can be prevented from being reduced due to positional deviations of flow lines in the optical axis direction.

The arithmetic device 10 according to the embodiments described above or a part of the arithmetic device 10e, for example, the signal intensity acquiring unit 110, the position calculation unit 111, the output unit 112, the scan unit 113, the optical information acquiring unit 114e, the position determining unit 115e, the discriminating unit 116e, and the learning unit 117e, may be implemented by a computer. In that case, these may be implemented by recording a program for implementing their control functions on a computer readable recording medium and causing a computer system to read and execute the program recorded on the recording medium. The "computer system" referred to here is a computer system built in the arithmetic device 10 or the arithmetic device 10e and includes an OS or hardware such as peripheral devices. The "computer readable recording medium" refers to a portable medium such as a flexible disk, a magneto-optical disc, a ROM, or a CD-ROM, a storage device such as a hard disk provided in the computer system, or the like. The "computer readable recording medium" may include something that dynamically holds a program for a short time, like a communication wire in the case in which the program is transmitted via a communication line such as a telephone line or a network such as the Internet, or may include something that holds a program for a certain period of time, like an internal volatile memory of a computer system that serves as a server or a client in that case. The program may be one for implementing some of the above-described functions or one which can implement the above-described functions in combination with a program already recorded in the computer system.

Also, all or a part of the arithmetic device 10 or the arithmetic device 10e according to the embodiments described above may be implemented as an integrated circuit such as large scale integration (LSI). Functional blocks of the arithmetic device or the arithmetic device 10e may be individually implemented as processors or some or all of the functional blocks may be integrated and implemented as a processor. The circuit integration is not limited to LSI and may be implemented by a dedicated circuit or a general-purpose processor. If an integrated circuit technology that replaces LSI emerges due to advances in semiconductor technology, an integrated circuit based on the technology may be used.

Although embodiments of the present invention have been described above in detail with reference to the drawings, the specific configurations thereof are not limited to those described above and various design changes or the like can be made without departing from the spirit of the invention.

REFERENCE SIGNS LIST

1 Flow cytometer
20 Flow path

2 Microfluidic device
50 Imaging lens
6 Photodetector
8 PC
10 Arithmetic device
CP Calibration pattern
C Cell
OX Optical axis
PP Depth position
SG Measurement signal
LS Signal light
IC Optical information
The invention claimed is:

1. A flow cytometer comprising:
a microfluidic device including a flow path through which an observation object is able to flow together with a fluid;
a light source configured to irradiate the flow path with illumination light;
a photodetector configured to detect, in time series, an intensity of signal light emitted from the observation object when the observation object flowing through the flow path is irradiated with the illumination light;
an information generation device configured to generate optical information indicating any one or more of a shape, form, or structure of the observation object based on the intensity of the signal light detected by the photodetector;
a flow path position control device configured to control a position in a depth direction of the flow path; and
an arithmetic device configured to detect a depth position, which is a position in the depth direction of the flow path where the observation object passes through the flow path, based on a time series changes in the intensity of the signal light detected by the photodetector,
wherein the arithmetic device includes:
a signal intensity acquiring unit configured to acquire electronic data of temporal changes in the intensity of the signal light detected at a detection position predetermined in the flow path to detect the depth position;
a scan unit configured to perform a scan process to move the flow path in the depth direction via the flow path position control device and acquire the electronic data at different depth positions;
a position calculation unit configured to calculate the depth position based on the electronic data; and
an output unit configured to output position information indicating the depth position calculated by the position calculation unit.

2. The flow cytometer according to claim 1, further comprising a spatial light modulation unit installed in an optical path between the light source and the photodetector to structure either the illumination light or the signal light.

3. The flow cytometer according to claim 2, wherein the spatial light modulation unit is disposed in an optical path between the light source and the flow path and the light source is configured to irradiate the flow path with the illumination light structured by the spatial light modulation unit.

4. The flow cytometer according to claim 3, wherein the detection position is established in the flow path by the illumination light structured by the spatial light modulation unit.

5. The flow cytometer according to claim 2, wherein the spatial light modulation unit is disposed in an optical path between the flow path and the photodetector and the photodetector is configured to detect an intensity of the structured signal light in time series.

6. The flow cytometer according to claim 5, wherein the spatial light modulation unit includes a mask having light transmissive regions through which light is transmitted, the light transmissive regions are disposed at a position forming an imaging relationship with a plurality of the detection positions in the flow path, and the arithmetic device is configured to detect the depth position based on the temporal changes in the intensity of the signal light emitted from the observation object detected at the plurality of detection positions in the flow path.

7. The flow cytometer according to claim 1, wherein the flow path position control device is configured to control a position in the depth direction of the flow path based on information indicating the depth position output by the output unit.

8. The flow cytometer according to claim 1, wherein the arithmetic device further includes:

a discriminating unit configured to discriminate the observation object based on the optical information generated by the information generation device; and a position determining unit configured to determine whether or not the depth position indicated by the position information output by the output unit is within a predetermined range in the depth direction in the flow path, and the discriminating unit is configured to designate the observation object flowing within the predetermined range as an object to be discriminated based on a determination result of the position determining unit.

9. The flow cytometer according to claim 8, wherein the discriminating unit is configured to discriminate the observation object based on both an inference model created by learning a relationship between an observation object for training and the optical information regarding the observation object for training and the optical information generated by the information generation device, and the observation object for training is an observation object flowing within the predetermined range.

10. A position calculation method for detecting a depth position in a flow cytometer, the flow cytometer including:

a microfluidic device including a flow path through which an observation object is able to flow together with a fluid;

a light source configured to irradiate the flow path with illumination light;

a photodetector configured to detect, in time series, an intensity of signal light emitted from the observation object when the observation object flowing through the flow path is irradiated with the illumination light;

an information generation device configured to generate optical information indicating any one or more of a shape, form, or structure of the observation object based on the intensity of the signal light detected by the photodetector;

a flow path position control device configured to control a position in a depth direction of the flow path; and an arithmetic device configured to detect the depth position, which is a position in the depth direction of the flow path where the observation object passes through the flow path, based on time series changes in the intensity of the signal light detected by the photodetector, the position calculation method comprising:

a procedure of acquiring electronic data of temporal changes in the intensity of the signal light detected at a detection position predetermined in the flow path to detect the depth position;

a procedure of performing a scan process to move the flow path in the depth direction via the flow path position control device and acquire the electronic data at different depth positions;

a position calculation procedure of calculating the depth position based on the electronic data; and an output procedure of outputting position information indicating the depth position calculated in the position calculation procedure.

11. A program for a flow cytometer, the flow cytometer including:

a microfluidic device including a flow path through which an observation object is able to flow together with a fluid;

a light source configured to irradiate the flow path with illumination light;

a photodetector configured to detect, in time series, an intensity of signal light emitted from the observation object when the observation object flowing through the flow path is irradiated with the illumination light;

an information generation device configured to generate optical information indicating any one or more of a shape, form, or structure of the observation object based on the intensity of the signal light detected by the photodetector;

a flow path position control device configured to control a position in a depth direction of the flow path; and an arithmetic device configured to detect a depth position, which is a position in the depth direction of the flow path where the observation object passes through the flow path, based on time series changes in the intensity of the signal light detected by the photodetector, the program causing the arithmetic device that performs a position calculation process for detecting the depth position in the flow cytometer to perform:

a step of acquiring electronic data of temporal changes in the intensity of the signal light detected at a detection position predetermined in the flow path to detect the depth position;

a step of performing a scan process to move the flow path in the depth direction via the flow path position control device and acquire the electronic data at different depth positions;

a position calculation step of calculating the depth position based on the electronic data; and an output step of outputting position information indicating the depth position calculated in the position calculation step.

* * * * *